US012673276B2

(12) United States Patent
Byron

(10) Patent No.: US 12,673,276 B2
(45) Date of Patent: Jul. 7, 2026

(54) SYSTEMS AND METHODS FOR FLUID MONITORING AND CONTENT CONTROL IN INDUSTRIAL FLUID SYSTEMS

(71) Applicant: James Arthur Byron, Ponte Vedra, FL (US)

(72) Inventor: James Arthur Byron, Ponte Vedra, FL (US)

( * ) Notice: Subject to any disclaimer, the term of this patent is extended or adjusted under 35 U.S.C. 154(b) by 0 days.

(21) Appl. No.: 19/380,848

(22) Filed: Nov. 5, 2025

(65) Prior Publication Data

US 2026/0061341 A1 Mar. 5, 2026

Related U.S. Application Data

(63) Continuation of application No. 18/948,437, filed on Nov. 14, 2024, which is a continuation-in-part of application No. 17/196,318, filed on Mar. 9, 2021, now Pat. No. 12,168,192.

(60) Provisional application No. 62/987,234, filed on Mar. 9, 2020.

(51) Int. Cl.
| | |
|---|---|
| *B01D 21/30* | (2006.01) |
| *B08B 1/12* | (2024.01) |
| *B08B 3/04* | (2006.01) |
| *G05B 19/43* | (2006.01) |

(52) U.S. Cl.
CPC .......... *B01D 21/305* (2013.01); *G05B 19/43* (2013.01); *B08B 1/12* (2024.01); *B08B 3/04* (2013.01)

(58) Field of Classification Search
CPC ........ B01D 21/305; G05B 19/43; B08B 3/04; B08B 1/12
See application file for complete search history.

(56) References Cited

U.S. PATENT DOCUMENTS

| | | | | | |
|---|---|---|---|---|---|
| 4,228,814 | A | * | 10/1980 | Luethi | G01N 27/38 |
| | | | | | 417/478 |
| 6,779,383 | B2 | * | 8/2004 | Lizotte | G01N 33/18 |
| | | | | | 73/61.48 |

FOREIGN PATENT DOCUMENTS

EP          1046901 A2 *  10/2000  ............. G01N 21/15

OTHER PUBLICATIONS

EP_1046901_A2 English Translation (Year: 2000).*

* cited by examiner

*Primary Examiner* — Terry K Cecil
(74) *Attorney, Agent, or Firm* — Wilson Dutra, PLLC; Camille A. Wilson

(57) ABSTRACT

The present disclosure provides an exemplary process for a system that may remove particulate from industrial fluids using a Particulate Removal System ("PRS"). In some aspects, this system may treat water pulled from different Industrial Fluid Systems ("IFS") while doing continuous monitoring and quality tests of the water. In some embodiments, the system may use sensors and other technology to allow for the system to periodically self-clean itself allowing for maximum efficiency and accuracy while also cleaning the water from the IFS. In some implementations, the water from the IFS may be separated through a Particulate Trap Mechanism ("PTM") to ensure that particulate including dissolved material has been removed from the water and separated from possible contamination throughout the system. In some aspects the system may be used for continuous and direct measurement of water quality and automatic chemical level adjustment by systems to maintain a desired range or setpoints.

20 Claims, 23 Drawing Sheets

840

1100

Tubing connection from dirty process water/liquid into invention

Clean water/liquid out of invention to sensor/probe via tubing

Clean water/liquid to continuous measurement instruments

1100

1200

1210

1200

1220

1200

1230

1200

OPTIONALLY RECEIVE CLEAN CYCLE ALERT

1805

CLOSE ACTUATOR FOR FLUID INTAKE

1810

OPTIONALLY DRAIN OR PURGE FLUID

1815

CLEAN SENSORS

1820

RINSE FLUID PATHWAYS

1825

OPTIONALLY DRAIN OR PURGE CLEAN CYCLE FLUID

1830

OPEN ACTUATOR FOR FLUID INTAKE

1835

<u>2010</u>

2150

2155

2165

SYSTEMS AND METHODS FOR FLUID MONITORING AND CONTENT CONTROL IN INDUSTRIAL FLUID SYSTEMS

CROSS REFERENCE TO RELATED APPLICATION

This application is a Continuation of and claims priority to and the full benefit of U.S. Nonprovisional patent application Ser. No. 18/948,437 (filed Nov. 14, 2024 and titled "SYSTEMS AND METHODS FOR FLUID MONITORING AND CONTENT CONTROL IN INDUSTRIAL FLUID SYSTEMS"), which claimed priority to and the full benefit of U.S. Nonprovisional patent application Ser. No. 17/196,318 (filed Mar. 9, 2021 and titled "SYSTEMS AND METHODS FOR FLUID MONITORING AND CONTENT CONTROL IN INDUSTRIAL FLUID SYSTEMS"), which claimed priority to and the full benefit of U.S. Provisional Patent Application Ser. No. 62/987,234 (filed Mar. 9, 2020 and titled "SYSTEMS AND METHODS FOR FLUID MONITORING AND CONTENT CONTROL IN INDUS-TRIAL FLUID SYSTEMS"), the entire contents of which are incorporated in this application by reference

BACKGROUND

Continuous Direct Measurement (CDM) of chemicals used in food processing systems is inhibited or made impossible by the presence of soluble and insoluble material in the system being monitored. In most food processing systems, the ideal goal is for chemicals to be added to water and automatically monitor and automatically control the level of chemicals in the water within a target range of chemical concentration. The presence of solid and dissolved or soluble material in the process water or liquid has embodied an impenetrable challenge preventing the use of chemical sensors to automatically continuously direct measure and control chemical levels in process waters and liquids.

The presence of solid and dissolved or soluble material in practice produces deposits on the surface of a probe or chemical sensor, interfering with accurate sensor function and preventing reliable automation of the automatic continuous measuring and control system. Without reliable chemical sensor probes or instruments, the food industry is required to perform manual sampling and manual chemical concentration measurement titrations on a periodic basis, usually once per hour, and use the chemical titration result to adjust chemical addition rate settings to "operate the process."

The legacy manual titration-control approach is inferior to an automated CDM technology that continuously monitors and continuously adjusts chemical to control chemical levels. Chemicals levels are measured by sensors or probes once every thirty seconds and proper chemical levels are automatically maintained continuously. Over several decades, the poultry industry, working with chemical manufacturers, has unsuccessfully attempted to develop a method of automation for water treatment, particularly for poultry chillers. These have been relatively unsuccessful prior efforts to develop a reliable method that enables automated sensor control of chiller chemical levels.

Removal of solid and dissolved or soluble material from process water and liquids is a significant challenge in the food industry, in agriculture, and in other industries. Fats, oils, grease, blood, feathers, and solid material are especially challenging. Conventional filtration systems are ineffective because media and filters become fouled or blinded, quickly resulting in unacceptable economics and poor operational performance. The performance of conventional filtration and separation equipment are especially poor with fluids like poultry chiller water that contains both solid materials, such as fat, protein, blood, feathers, foam, and dissolved materials, such as fat and oil, suspended in water. Efforts to use real-time instrumentation and sensors or probes to monitor poultry chiller water chemical levels have been frustrated because of historically unreliable instrument and sensor performance as a result of probe or sensor fouling or loss of sample flow associated with material suspended in the water.

SUMMARY OF THE DISCLOSURE

What is needed is a system and method for particulate removal in Industrial Fluid Systems ("IFS"). In some embodiments, this may include at least one device that is dependable for extended periods of use, operating continuously for a week or several weeks without service to produce water or liquid of a quality. In some implementations, a system and method may accurately measure chemical levels using electronic chemical sensors or probes. In some aspects, the system and method enables automation of process control to replace the manual sample, manual titrate, and manual adjust requirement for chemical control historically and currently used within the poultry industry and other food production environments. In some embodiments, the system and method facilitates CDM of process liquid and control the process effectively using automatic sensors or probes to control chemical addition.

One general aspect may comprise a particulate removal system for continuous fluid sampling in industrial fluid systems. In some embodiments, the particulate removal system may comprise a receiving end configured to receive fluid from an industrial fluid system; a plurality of sensors, where each of the plurality of sensors may be configured to monitor a predefined attribute of fluid received from the industrial fluid system when fluid may be flowed in contact with each of the plurality of sensors; at least one fluid actuator controlling flow of fluid from the industrial fluid system to the particulate removal system; an outflow end to expel fluid flowed through the particulate removal system; and a controller in logical communication with one or more of the plurality of sensors and the at least one fluid actuator, where the controller controls a position of the at least one fluid actuator.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Other embodiments of this aspect include corresponding computer systems, apparatus, and computer programs recorded on one or more computer storage devices, each configured to perform the actions of the methods.

In some embodiments, the system may include a particulate trap mechanism located between the industrial fluid system and the system for fluid monitoring, where the particulate trap mechanism removes particulate from fluid. In some implementations, dispensing may be based on predefined threshold parameters of at least a portion of predefined attributes monitored by the plurality of sensors. In some aspects, the chemical control system may maintain fluid within predefined parameters of at least a portion of predefined attributes monitored by the plurality of sensors. In some embodiments, fluid sampling data may be displayed through the control panel. In some implementations, fluid sampling data may be displayed wirelessly to an external device.

In some aspects, the cleaning system may comprise at least one quill configured to dispense fluid across at least a portion of the plurality of sensors during a cleaning cycle. In some embodiments, the controller triggers at least one actuator to stop flow of the fluid from the industrial fluid system to the particulate removal system during the cleaning cycle. In some implementations, at least a portion of the plurality of sensors may be configured to monitor accumulation of particulate on the portion of the plurality of sensors, where detection of a threshold accumulation level initiates the cleaning cycle. In some embodiments, implementations of the described techniques may include hardware, a method or process, or computer software on a computer-accessible medium.

In some implementations, the system may include a particulate removal system for continuous fluid sampling in industrial fluid systems a pipe system connected to an industrial fluid system, where the pipe system continuously receives fluid from the industrial fluid system, and where the pipe system may comprise a plurality of sensors, where each of the plurality of sensors may be configured to monitor a predefined attribute of the fluid received from the industrial fluid system when the fluid may be flowed in contact with each of the plurality of sensors; at least one fluid actuator controlling flow of the fluid from the industrial fluid system to the pipe system; and an outflow end to expel fluid flowed through the pipe system. In some aspects, the system may include corresponding computer systems, apparatus, and computer programs recorded on one or more computer storage devices, each configured to perform the actions of the methods.

In some embodiments, the particulate removal system where the outflow end may be a terminating end for the flow of fluid. In some implementations, dispensing may be based on predefined threshold parameters of at least a portion of predefined attributes monitored by the plurality of sensors. In some aspects, the cleaning system may comprise at least one quill configured to dispense fluid across at least a portion of the plurality of sensors during a cleaning cycle.

In some embodiments, the cleaning system further may comprise a reservoir providing cleaning fluid to the at least one quill. The cleaning system further may comprise a rotating brush located in the sensor housing for cleaning the sensor. In some implementations, at least one actuator may stop flow of the fluid from the industrial fluid system to the particulate removal system during the cleaning cycle. In some aspects, at least a portion of the plurality of sensors may be configured to monitor accumulation of particulate on the portion of the plurality of sensors, where detection of a threshold accumulation level initiates the cleaning cycle.

In some embodiments, a particulate trap mechanism may comprise a particulate removing media; a containing portion configured to contain the particulate removing media, a fluid intake connector configured to accept fluid from an industrial fluid system into the containing portion and through the particulate removing media, and a fluid outflow connector configured to dispense clean fluid from the containing portion to a continuous direct measurement system.

In some implementations, the particulate trap mechanism may include a particulate sensor, where the particulate sensor may be configured to detect a level of particulate build up within the particulate removing media. In some aspects, the particulate trap mechanism may be configured to remove one or more particulate, dissolved solids, or soluble material from the fluid. In some embodiments, removal may occur when the one or more particulate, dissolved solids, or soluble materials collides with the particulate removing media.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

Figure 1:
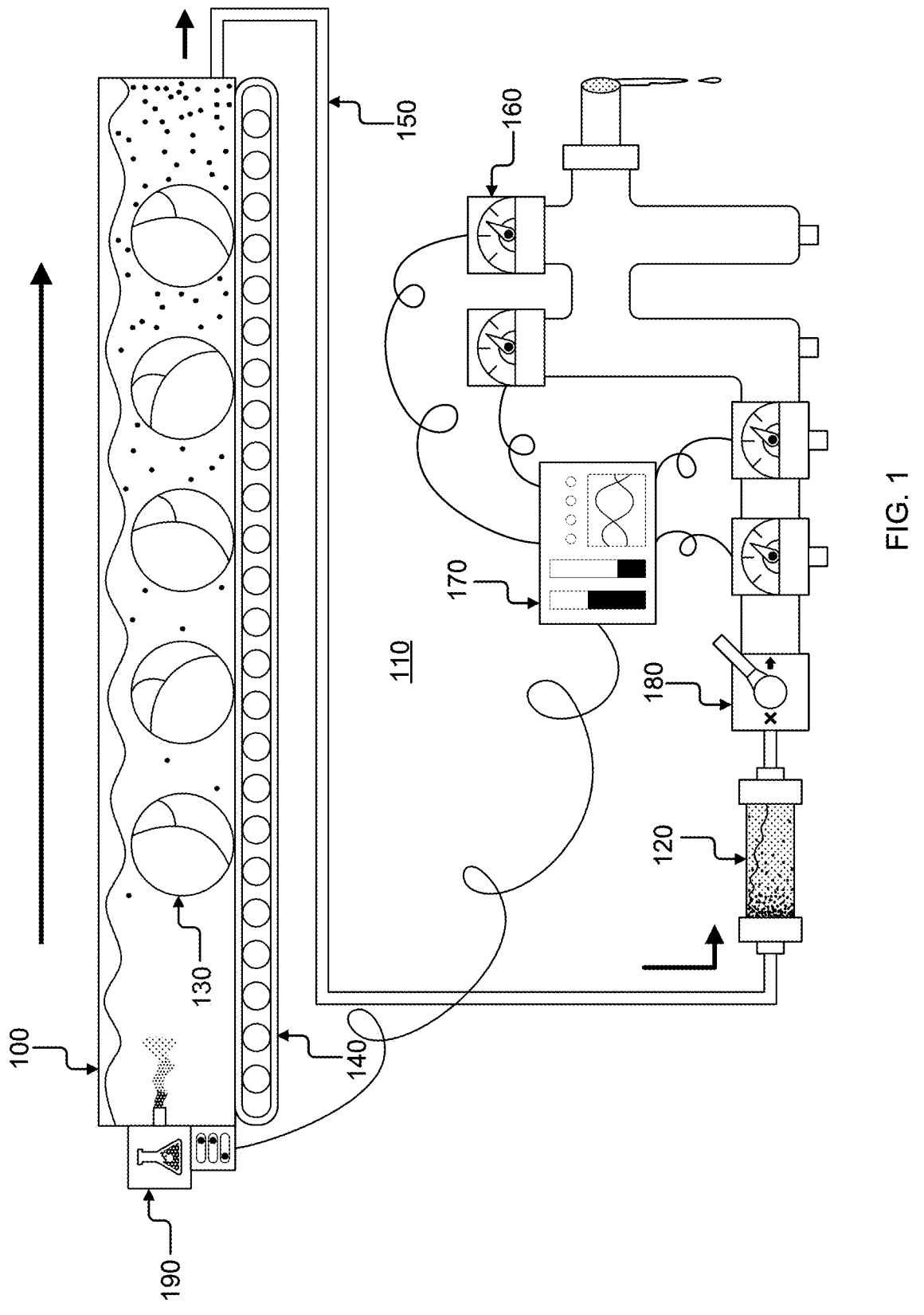
FIG. 1 illustrates an industrial fluid system with exemplary particulate removal system for continuous fluid sampling, according to some embodiments of the present disclosure.

The Figures are not necessarily drawn to scale, as their dimensions can be varied considerably without departing from the scope of the present disclosure.

DETAILED DESCRIPTION

The present disclosure provides generally for a system that may remove particulate from Industrial Fluid Systems ("IFS"). According to the present disclosure, the system may provide a Particulate Removal System ("PRS") through which particulate may be separated out of liquid from an IFS. In some implementations, the particulate may be separated from fluid from an IFS, which may limit adhesion of particulate to sensitive equipment, such as sensors for fluid quality testing. Excessive particulate may limit the functionality of sensitive equipment within an IFS.

In some aspects, a PRS may perform self-cleaning cycles to limit the need for manual operation or maintenance of the PRS. In some implementations, this may occur periodically to ensure the components in the PRS maintain accuracy, effectiveness, and efficiency. In some embodiments, the system may include at least one Particulate Trap Mechanism ("PTM"), which may help separate the particulate out of the water and keep it separate from one or both a PRS and IFS. In some implementations, a PTM may comprise different types of media for different types of IFS and particulate being removed out of the system.

In some aspects, the Particulate Removal System ("PRS") may help remove particulate from the fluid of the IFS, wherein the clean fluid may be flowed back into the IFS. In some implementations, sample fluid may be removed from an IFS and flowed through a PRS to allow for continuous monitoring of fluid quality. In some embodiments, a PRS may use sensors and monitoring equipment to test the fluid from an IFS based on predefined quality parameters. For example, for poultry processing, regulations require water from a chiller to fall within an acceptable chemistry range, such as the level of peracetic acid, acidified sodium chlorite ("ASC"), or another chemical, which may limit the risk of *Salmonella*. In some implementations, a PRS may receive notifications about all ongoing processes and updates via at least one control panel that may be fully accessible by a user.

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Particulate Removal System ("PRS"): as used herein refers to a system that removes particulate from an industrial fluid system through use of a PTM. In some embodiments, a PRS may be integrated with an industrial fluid system, such as for continuous fluid sampling or fluid maintenance.

Particulate Trap Mechanism ("PTM"): as used herein refers to a mechanism that traps particulate as fluid passes through the PTM.

Industrial Fluid System ("IFS"): as used herein refers to an industrial system that is dependent on fluid. In some embodiments, an IFS may comprise a water chiller system or dip tank, such as used in poultry processing, meat processing, or commercial food preparation, as non-limiting examples. In some implementations, an IFS may comprise a rinsing or cleaning system, such as for cleaning produce. In some aspects, an IFS may comprise a conveyor system for delicate items, wherein fluid may limit risk of damage, such as for easily bruised produce. In some embodiments, an IFS may comprise a petroleum system.

Referring now to FIG. 1, an industrial fluid system ("IFS") 100 with exemplary particulate removal system ("PRS") 110 for continuous fluid sampling, according to some embodiments of the present disclosure, is illustrated. In some embodiments, an IFS 100 with a PRS 110 may be used for continuous fluid sampling throughout the process. In some aspects, a product 130 may be placed onto a conveyance system, such as, for example and not limitation, conveyor belt 140, a conveying screw, or a conveying dragline within an IFS 100, such as may be used, for example and not limitation, with produce processing and poultry chilling. In some implementations, a portion of fluid from the IFS 100 may be flowed through a sampling pipe 150.

In some aspects, the IFS 100 may be part of a cold chain and may regulate processing temperature for a product, such as sauces, poultry, agricultural produce, seafood, chemicals, or pharmaceutical drugs, as non-limiting examples. In some embodiments, the IFS 100 may comprise a chiller that may be configured to cool or heat one or more products based on one or more predefined parameters. By way of example and not limitation, once eviscerated, poultry may need to be chilled to a predetermined or predefined temperature to limit the risk of contamination by bacteria. By way of further example and not limitation, some products may be cooked or heated during the manufacturing process and may need to be cooled for transportation and safe maintenance.

In some embodiments, the sampling pipe 150 may draw a limited stream of fluid from the IFS 100, such as may be necessary to adequately assess the quality of the fluid. In some implementations, automatic addition of one or more chemicals may be added to maintain a desired or required chemical concentration range within the IFS 100. By way of example and not limitation, caustic, acid, or other material may be added to maintain a predefined pH setpoint, which may allow for the maintenance of peracetic acid, acidified sodium chlorite ("ASC"), or another chemical level, range, or setpoint required by the system while also maintaining the range of the system. In some aspects, the sampling pipe 150 may be accessed by a user, which may allow the user to manually draw fluid to support or verify the findings of the sensor(s) 160 within a PRS 110. In some implementations, the fluid may need to be treated based on the test results or observation by the user or the PRS 110. In some aspects, a PRS 110 may allow for one or more direct additives for testing purposes without affecting the overall quality of the fluid in the IFS 100. By way of example and not limitation, dyes or chemicals may be used to prepare fluid for sensor(s) 160.

In some embodiments, the sensor(s) 160 may notify the system and the user when particulate or unwanted chemistry is detected. By way of example and not limitation, the sensor(s) 160 may indicate where the particulate or unwanted chemistry may be located throughout the PRS, which may allow a user to address the issue. In some aspects, particulate may comprise one or more of: blood, fat, excess product, soluble material, or solids of any kind, whether dissolved or not, as non-limiting examples. In some embodiments, the sensor(s) 160 may also indicate when the IFS or PRS may be out of compliance, which may occur, for example, if particulate adheres to a sensor 160 or peracetic acid, acidified sodium chlorite ("ASC"), or another chemical level deviates outside an acceptable range. In some embodiments, the sensor 160 may be configured to notify the PRS 110 of the issue.

In some implementations, the PRS 110 may integrate the technology of the sensor(s) 160 into the system allowing for continuous liquid flow monitoring. In some embodiments, the PRS 110 may self-clean to regulate the clean water running through the system and facilitate the ability of the system to operate smoothly with a minimum efficiency. In some implementations, the PRS 110 may flow water through at least oneParticulate Trap Mechanism ("PTM") 120 to help keep the system clean. In some embodiments, the PRS 110 may use a separate water source to flush in water to the system that cleans the sensor(s) 160 and flushes out any unwanted particulate from the system.

In some embodiments, the PTM 120 may act as a physical separation device for all of the unwanted particulate that circulates throughout the system. In some implementations, the PTM 120 may become filled with unwanted particulate, and once full the PTM 120 may notify the system and a user may flush the PTM 120 or change the media. In some aspects, one or more fluids may be forced through the PTM 120 to empty the particulate out of the system, or one or more fluids may be used to dissolve everything in the PTM 120. In some embodiments, the PTM 120 may be filled with one or more media, which may comprise, by way of example and not limitation, one or more of: porous rocks, scrubbers, plastic objects or structures, or bristles. In some implementations, media may be used to facilitate a decrease in the velocity of the water flow and cause a change in direction to cause a collision or colliding of solids, soluble materials, or particulate with media, thereby separating the solids, soluble materials, or unwanted particulate from the fluid.

In some aspects, the PTM 120 may allow for clean water to flow out of the PTM 120 without releasing any of the particulate from the PTM 120. In some implementations, the PTM 120 may be cleaned out manually when the system is notified that the PTM 120 is full. In some implementations, once the PTM 120 is filled the PTM 120 may notify the system and the system may notify the user to empty the PTM 120. In some aspects, the PTM 120 may be emptied when the system is turned off and it is safe for the user to empty the unwanted particulate out of the PTM 120. In some embodiments, the system may clean the PTM 120 periodically when it senses the PTM 120 is full or is becoming full. By way of example and not limitation, the system may comprise a separate compartment where unwanted particulate may be automatically transferred from the PTM 120.

In some implementations, the PTM 120 may be configured to help break down larger solids, soluble materials, or particulate in the water stream. In some aspects, the media within the PTM 120 may be disconnected from the PTM 120 and cleaned out manually to reduce or minimize the occurrence of equipment failure or possible permanent damage to the media. In some embodiments, at least one fluid actuator 180 may be used to control the flow of the fluid in the system. In some implementations, the fluid actuator 180 may be configured to be altered to a closed or shut position to stop the fluid from flowing throughout the system when the PTM 120 is being cleaned or the system is being treated. In some aspects, the fluid actuator 180 may be adjusted to one or more positions to facilitate different flow levels in the system at different times to account for different circumstances. By way of example and not limitation, the fluid actuator 180 may be closed partially to reduce the fluid flow rate to accommodate an increased number of tests performed by the system and the fluid actuator 180 may be reopened when the system is done being treated.

In some implementations, at least one controller 170 may be used to control all or some aspects of one or both the PRS and the IFS. In some embodiments, the controller 170 may be configured to control the flow of the water or fluid in the system, the conveyance system conveyor belt 140, the fluid actuator 180, the sensor(s) 160, the PTM 120, the PRS 110 and the IFS 100. In some implementations, the controller 170 may be configured to be used to turn the entire system on and off or reset the system when it malfunctions. In some embodiments, the controller 170 may be programmed by a user to implement, instigate, or initiate one or more processes, operations, functions, adjustments, or alterations upon the system. By way of example and not limitation, the user may program the controller 170 to automatically treat the system once a week at a specified or predetermined time.

In some aspects, at least one chemical control system 190 may be used to facilitate or maintain quality control of the fluid throughout the system. In some implementations, the system may be notified that a fluid quality may be out of an acceptable range or compliance level, which may trigger a chemical control system 190 that may be configured to add one or more chemicals to the fluid to adjust the problematic levels. By way of example and not limitation, the fluid may become tainted or may be too caustic, and the sensor(s) 160 may be configured to notify the control panel 170 of the issue(s). In some aspects, the notification may trigger the chemical control system 190 to disperse at least a portion of the chemical contents into the system and into the stream of the fluid. In some embodiments, the chemical control system 190 may contain different chemicals based on the use of the fluid in the system.

In some aspects, a user may fill the chemical control system 190 with any chemical(s) that may facilitate improved or maximum functionality of the system. In some implementations, the chemical control system 190 may be connected with a chemistry supply system that may be able to provide one or more of a variety of chemicals that may be useful to adjust one or more monitored fluid qualities. By way of example and not limitation, one or more chemicals that may adjust pH may be supplied at one or more locations where pH may be monitored.

In some embodiments, the chemical control system 190 may be physically attached to the IFS 100 and connected to the control panel 170, which may allow for direct communication between the PRS 110 and the chemical control system 190. In some implementations, the connection to the control panel 170 may be wired to an individual port so that the chemical control system 190 may be controlled from the control panel 170 rather than being controlled individually. In some embodiments, the chemical control system 190 may be configured to control the levels of one or more chemicals in the chiller fluid without using data from the sensor(s) 160. By way of example and not limitation, the control panel 170 may be configured to enable the chemical control system 190 to automatically disperse one or more chemicals throughout the system on a timed basis for the chiller fluid.

Figure 2:
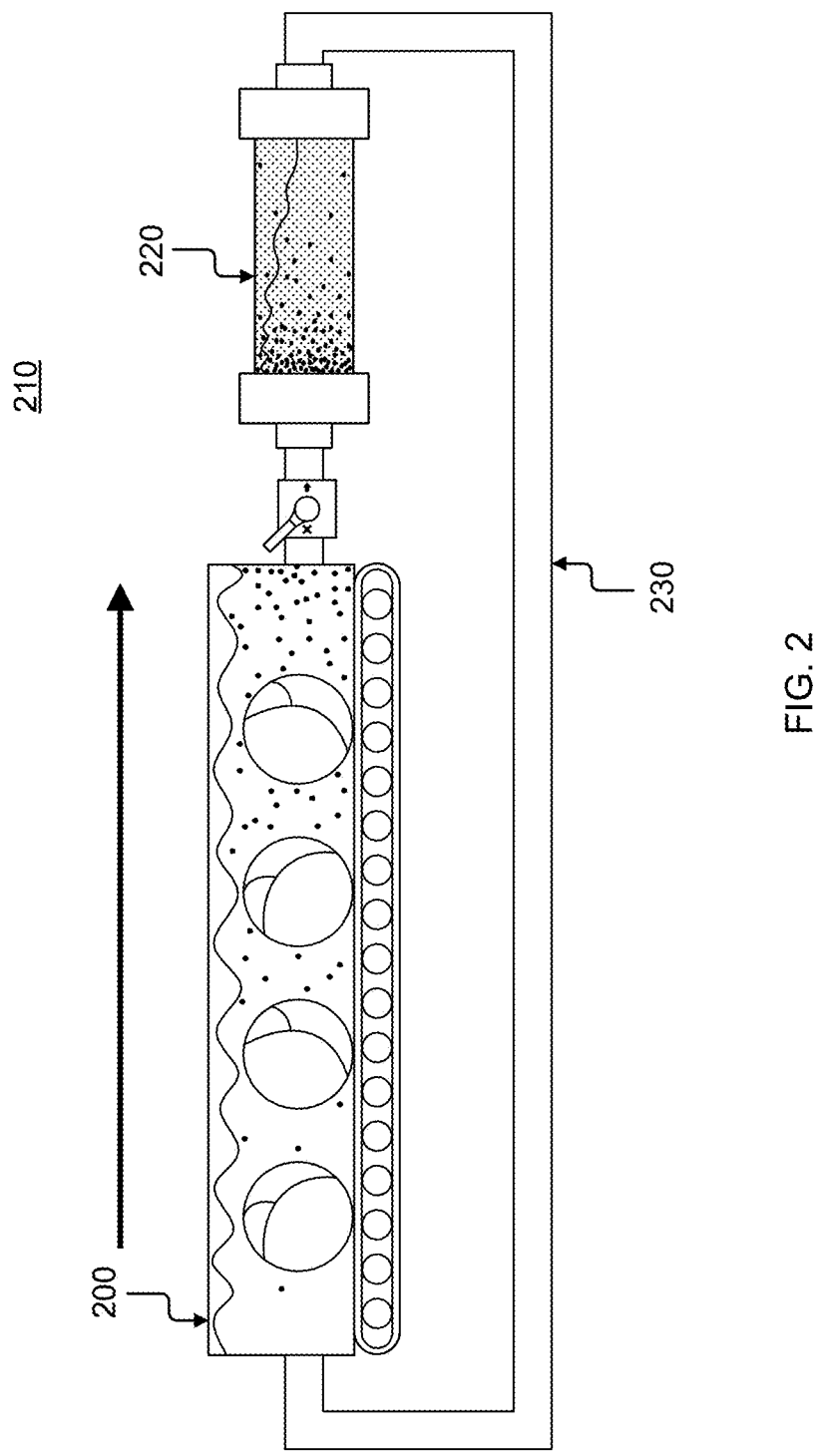
FIG. 2 illustrates an industrial fluid system with exemplary particulate removal system for fluid maintenance, according to some embodiments of the present disclosure.

Referring now to FIG. 2, an industrial fluid system 200 with exemplary particulate removal system for fluid maintenance, according to some embodiments of the present disclosure, is illustrated. In some aspects, the IFS 200 may be configured with a particulate removal system in which the particulate may be removed when fluid maintenance is being performed. In some embodiments, water may flow from the IFS 200 directly into at least one PTM 220 where the fluid may be cleaned. In some aspects, the system may be configured such that one or more chemicals may be automatically added to the system to maintain the chemical range(s) and pH level(s) of the chiller fluid throughout its cycle through the system. In some implementations, the fluid may be flowed through the PTM 220 so that the PTM 220 may separate the particulate out of the water using the media described in FIG. 1.

Figure 4:
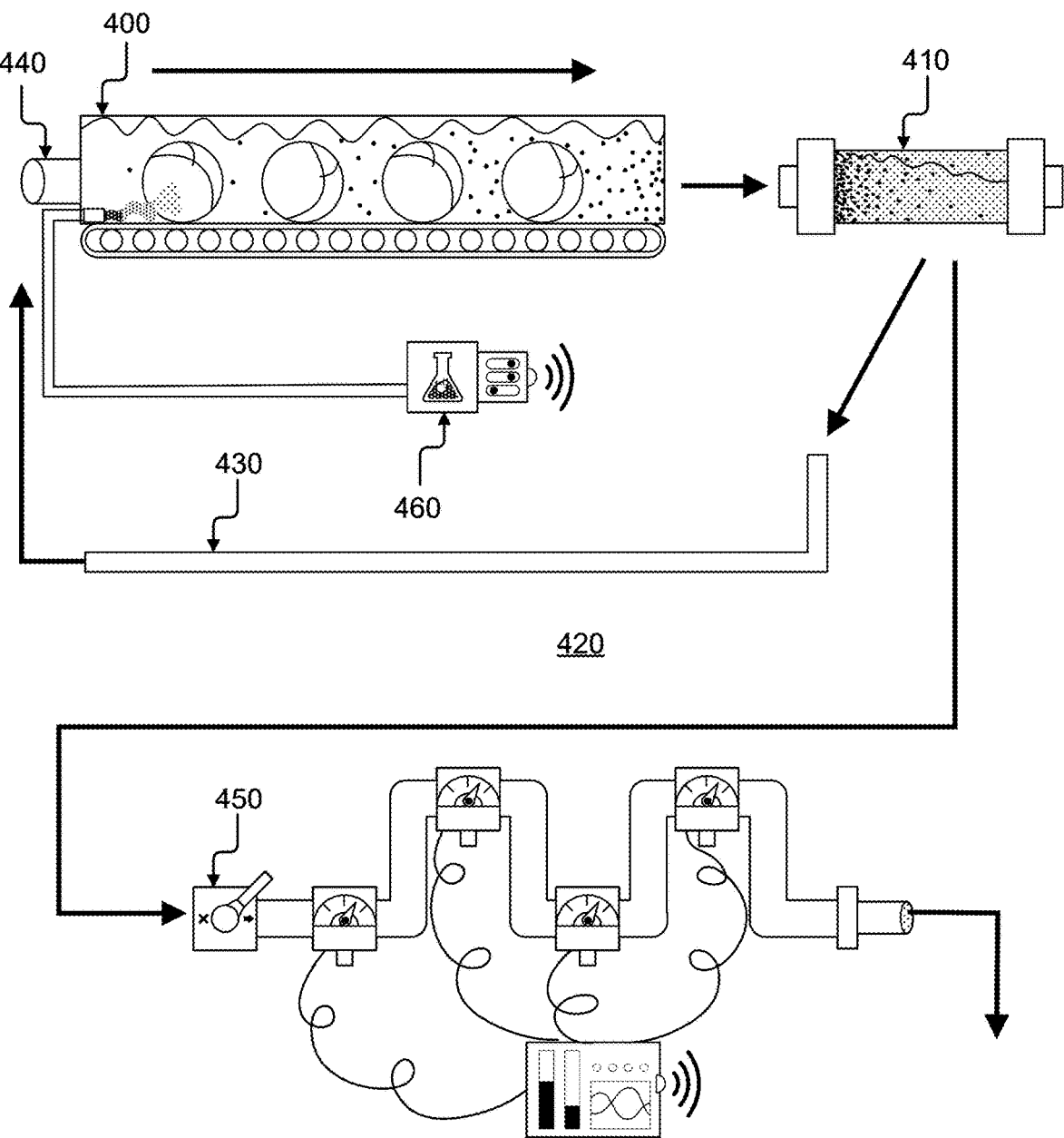
FIG. 4 illustrates an industrial fluid system with exemplary particulate removal system for continuous fluid sampling and fluid maintenance, according to some embodiments of the present disclosure.

In some implementations, the fluid may be recirculated through a PTM 220 for multiple pass throughs, which may increase the amount of particulate removed from the fluid. In some aspects, the number of pass throughs may depend at least partially on particulate levels. By way of example and not limitation, for low amounts of particulate, the fluid may not require a deep cleansing. In some embodiments, the circulation may be dynamic and adjusted in real time based on sensor data, such as illustrated in FIGS. 1 and 4.

In some implementations, once the fluid flows through the PTM 220 the fluid may be directed through at least one maintenance pipe 230 back into the IFS 200. In some embodiments, the maintenance pipe 230 may comprise one or more sensors and/or some indication method to notify the system that the water may not have been properly or sufficiently cleaned. In some implementations, the maintenance pipe 230 may comprise one or more valves on each end which may be configured to open and close when directed to stop the flow of fluid inside the pipe 230. By way of example and not limitation, if the fluid is detected as being contaminated, the valves may be closed to prevent the contaminated water from reentering the IFS 200.

In some embodiments, the valve system as previously mentioned may also aid in pushing the fluid through the PTM 220. In some aspects, the system may be configured to automatically add one or more chemicals to achieve or maintain a predefined chemical range or pH level(s) of the chiller fluid throughout the system. In some implementations, the velocity at which the fluid travels may affect how well the fluid is cleaned and what media is required to be used to clean the fluid. In some embodiments, different velocities of the fluid may be more effective in some circumstances than others. By way of example and not limitation, the velocity may be based on levels of particulate, types of particulate, types of fluid, industry standards, IFS type, PRS types, PTM media, or PTM type, structure, or configuration. In some implementations, the velocity of the fluid may help keep the fluid clean for longer periods of time, thereby avoiding the constant cleaning of the fluid.

In some embodiments, different sensor types may help determine the velocity of the fluid in different areas of the system, which may enable the system to effectively monitor and regulate the fluid flow within a predefined velocity range so the system may perform correctly. By way of example and not limitation, a sensor may require a predefined contact duration to provide accurate results, and so a fluid flow velocity that is too high may prevent an effective sensor reading. In some embodiments, the sensor may be configured to regularly monitor the velocity of the fluid and ensure that the fluid maintains the appropriate velocity for the system, and if the fluid were to flow outside the acceptable velocity range, the sensor data may be sent to the control panel of the system, allowing for real time adjustment. In some embodiments, the control of chemical levels may be monitored by the CDM to remove particulate from fluid and continuously work to maintain qualities to a setpoint.

Figure 3:
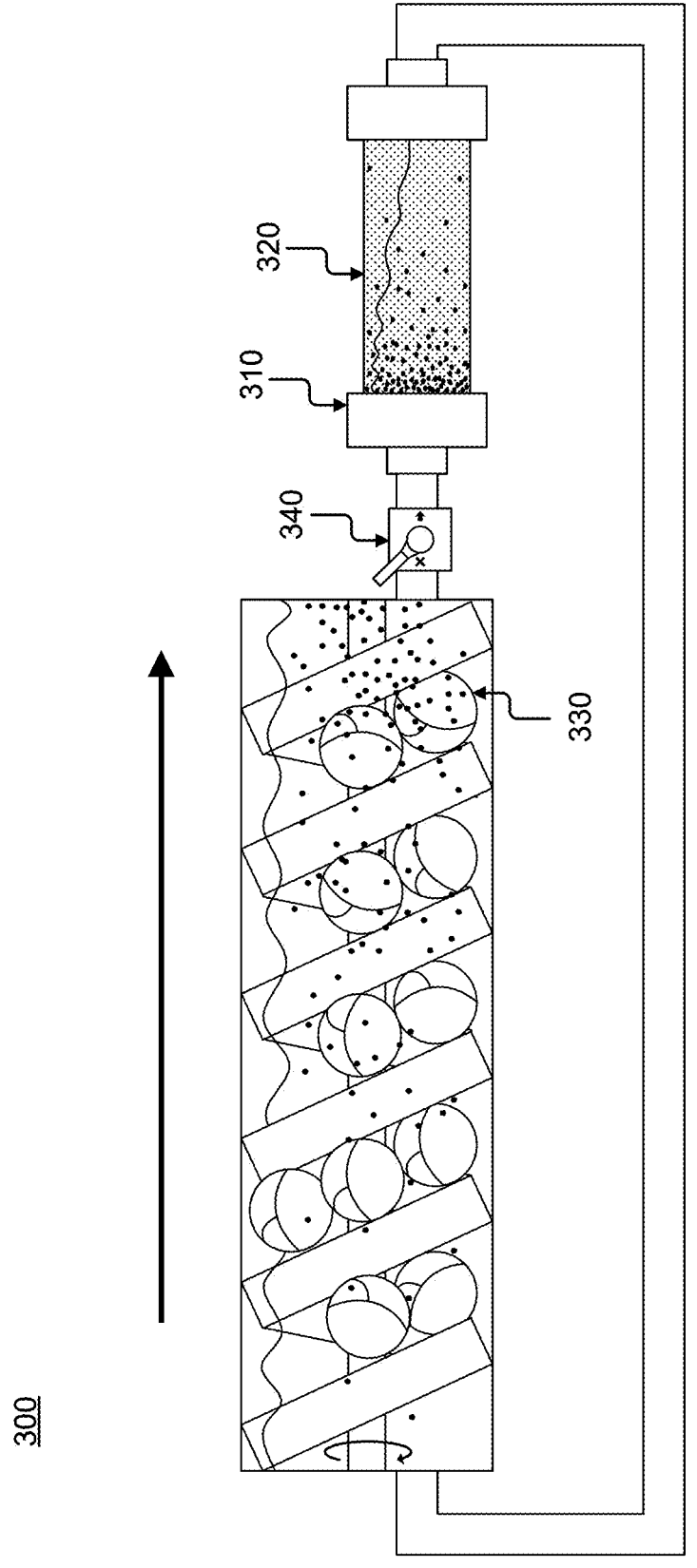
FIG. 3 illustrates an industrial fluid system with exemplary particulate removal system for fluid maintenance, according to some embodiments of the present disclosure.

Referring now to FIG. 3, an industrial fluid system 300 with exemplary particulate removal system 310 for fluid maintenance, according to some embodiments of the present disclosure, is illustrated. In some implementations, the IFS 300 may comprise at least one screw mechanism at, near, or proximate to the center of the IFS 300. In some embodiments, the IFS 300 may comprise a substantially hollow center portion with one or more threads, slats, or discs that allow for at least one product 330 to be screwed into the device. In some aspects, a bar-like mechanism may comprise one or more threads, slats, or discs on an outside portion thereof that may be retained in the center of the IFS 300. In some embodiments, one or more portions of the outer walls of the IFS may comprise one or more extruded threads, slats, or discs to facilitate unidirectional motion of the product 330.

In some implementations, at least one fluid actuator 340 may be configured to regulate fluid flow within the IFS 300. In some aspects, fluid from the IFS 300 may be directed through the PRS 310. In some embodiments, the PRS 310 may comprise a PTM 320.

In some embodiments, the PRS 310 may be utilized for continuous fluid sampling in the IFS 300. In some implementations, the PRS 310 may comprise a receiving end configured to receive fluid from an IFS 300. In some aspects, the PRS 310 may comprise at least one controller. In some embodiments, the PRS 310 may comprise at least one sensor. In some implementations, the PRS 310 may comprise at least one control panel. In some aspects, the PRS 310 may comprise one or more fluid actuators 340. In some implementations, the PRS 310 may comprise fluid sampling.

In some embodiments, the PRS 310 may comprise at least one pipe system connected to an IFS 300, wherein the pipe system may be configured to continuously receive fluid from the IFS 300. In some implementations, the pipe system may comprise one or more sensors, wherein each of the one or more sensors may be configured to monitor at least one predefined attribute of the fluid received from the IFS 300 when the fluid is flowed in contact with each of the one or more sensors. In some aspects, the pipe system may comprise at least one fluid actuator 340 that may be configured to control the flow of the fluid from the IFS 300 to the pipe system. In some embodiments, the pipe system may comprise an outflow end to expel fluid flowed through the pipe system.

In some implementations, a PTM 320 may comprise one or more particulate removing media. In some aspects, a PTM 320 may comprise at least one containing portion configured to contain the particulate removing media. In some embodiments, a PTM 320 may comprise at least one fluid intake connector configured to accept fluid from an IFS 300 into the containing portion and through at least one portion of the particulate removing media. In some implementations, a PTM 320 may comprise at least one fluid outflow connector configured to dispense clean fluid from the containing portion to a continuous direct measurement system.

In some implementations, at least one product 330 may be pushed in between the threads, slats, or discs of the IFS 300. In some aspects, one or more different attachments may supplement the functionality of the IFS 300. By way of example and not limitation, a particulate removal system may be used to enhance the flow stream of the IFS 300. In some aspects, the attachment may comprise at least one switch that may be configured to alter the attachment between an "on" state and an "off" state. By way of example and not limitation, the attachment may comprise a switch that may be configured to permit or block the flow of liquid from the IFS 300 to the attachment.

Referring now to FIG. 4, an industrial fluid system 400 with exemplary particulate removal system 420 for continuous fluid sampling 450 and fluid maintenance 430, according to some embodiments of the present disclosure, is illustrated. In some implementations, the PTM 410 may comprise at least one sensor or monitoring portion through which fluid may flow for testing, wherein removing a small portion of the fluid may be sufficient to monitor quality or to ensure the fluid has not been contaminated. In some implementations, a small portion of fluid may be removed at one or more various locations throughout the IFS 400 to enable continuous fluid sampling to occur throughout the system. In some aspects, if the PRS 420 detects that the fluid has been cleaned or uncontaminated, the fluid may be permitted to flow directly back into the IFS 400.

In some implementations, a PRS 420 may be continuously working to test fluid, remove particulate from the fluid, and achieve or maintain one or more chemical qualities of the fluid based on one or more predefined criteria. In some aspects, the PRS 420 may allow for a responsive treatment of the fluid that may directly adjust one or more chemistry levels of the fluid based on sensor data, such as by adding one or more chemicals to the fluid, as a non-limiting example. In some embodiments, a PRS 420 may comprise a PRS alert status 430 which may be configured to notify the system and the user of one or more various issues that may occur. In some implementations, the PRS alert status 430 may be configured to notify the user when the system is malfunctioning. In some aspects, the PRS alert status 430 may be configured to automatically shut the system off when an issue occurs. In some embodiments, the PRS alert status

430 may be configured to notify the system when one or more sensors have malfunctioned or are rendered ineffective, such as by collecting an accumulation of particulate, as a non-limiting example.

In some implementations, the PRS alert status 430 may be configured to trigger a regularly scheduled cleaning that may be programmed into the system manually. In some implementations, the PRS alert status 430 may comprise one or more sensors that may be configured to detect one or more aspects that may indicate that one or more portions of the system need to be cleaned. In some embodiments, the PRS alert status 430 may be configured to notify the system when the fluid coming out of the PTM 410 is too dirty or has been contaminated, as non-limiting examples. In some aspects, this may trigger the system to close one or more valves or similar mechanisms to block the fluid from flowing through the PTM 410 and execute at least one cleaning cycle for or within the PTM 410 before the fluid may be released to resume flowing through the system. In some embodiments, the PRA alert status 430 may be configured to notify the system that the PTM 410 is not working properly and needs maintenance or needs to be replaced because of a malfunction, as non-limiting examples.

In some embodiments, the PRS 420 may be configured to operate autonomously. In some implementations, the PRS 420 may be configured to store data pertaining to one or more typical, routine, expected, or customary fluid cycles and chemical levels, as non-limiting examples of fluid attributes. In some aspects, the PRS 420 may be configured utilize one or more machine learning algorithms and/or artificial intelligence infrastructures to automatically adjust one or more fluid attributes during use. In some embodiments, the PRS 420 may be configured to detect when the fluid attribute(s) exceed one or more predefined thresholds and automatically initiate or implement one or more remedial measures to bring the IFS 400 within the threshold tolerance level(s)

In some implementations, the PRS 420 may be configured to monitor one or more predetermined thresholds continuously during use of the IFS 400 and activate at least one automated protocol when the threshold(s) are exceeded.

As a non-limiting illustrative example, the PRS 420 may detect that the salinity of the IFS 400 is too high, one or more sensors are generating readings that exceed accuracy tolerance levels, and the medium in the PTM 410 is saturated with one or more byproducts from the IFS 400. In some aspects, the PRS 420 may be configured to calculate or otherwise determine the required fluid level reduction needed to ensure that fresh water lowers the salinity level(s) to meet the predefined threshold(s). In some implementations, the PRS 420 may be configured to utilize at least one internal cleaning system to improve sensor accuracy. In some embodiments, the PRS 420 may be configured to repeat the cleaning cycle when the readings continue to display inaccuracies exceeding one or more predetermined tolerances. In some aspects, the PRS 420 may be configured to activate at least one fluid actuator to reduce the amount of fluid flow through the PTM 410 sufficient to use mechanical automation to replace the saturated PTM 410 medium.

In some implementations, the PRS alert status 430 may be configured to notify the system of any malfunction that may occur within one or more sections of the system. In some aspects, the system may be configured to autonomously correct the identified errors, or the system may be configured to notify the user that one or more detected or otherwise identified issues may need further manual maintenance. By way of example and not limitation, the PRS alert status 430 may be configured to fix an internal issue that may be occurring within the PTM 410; however, in some instances if the PTM 410 needs to be replaced, the user may be notified and prompted to replace the PTM 410.

In some embodiments, at least one chemical control system 460 may be controlled via at least one control panel using at least one wireless or wired connection. In some aspects, the chemical control system 460 may be used to control one or more chemistry levels of the chiller fluid throughout one or more portions of the system. In some aspects, the wireless or wired connection may enable the chemical control system 460 to comprise a separate device, which may be configured to control the fluid by facilitating the flow of one or more chemicals through one or more sections of tubing into the IFS. In some embodiments, the control panel may be programmed to autonomously enable the chemical control system 460 to disperse one or more chemicals through one or more portions of the system.

In some aspects, the sensor(s) of the system may be configured to detect data that may be transmitted to the control panel to signal the chemical control system 460 to disperse one or more chemicals to stabilize the chiller fluid throughout one or more portions of the system. In some implementations, the chemical control system 460 may comprise one or more different chemicals based on the systems' chiller fluid composition, the preferences of the user, or the requirements or configuration of the IFS 400. By way of example and not limitation, different IFS 400 configurations may require different chemistry levels of fluid, and based on the predefined criteria for a IFS 400, the chemical control system 460 may comprise one or more relevant adjusting chemicals for dispersement into the system when needed or required.

Figure 5:
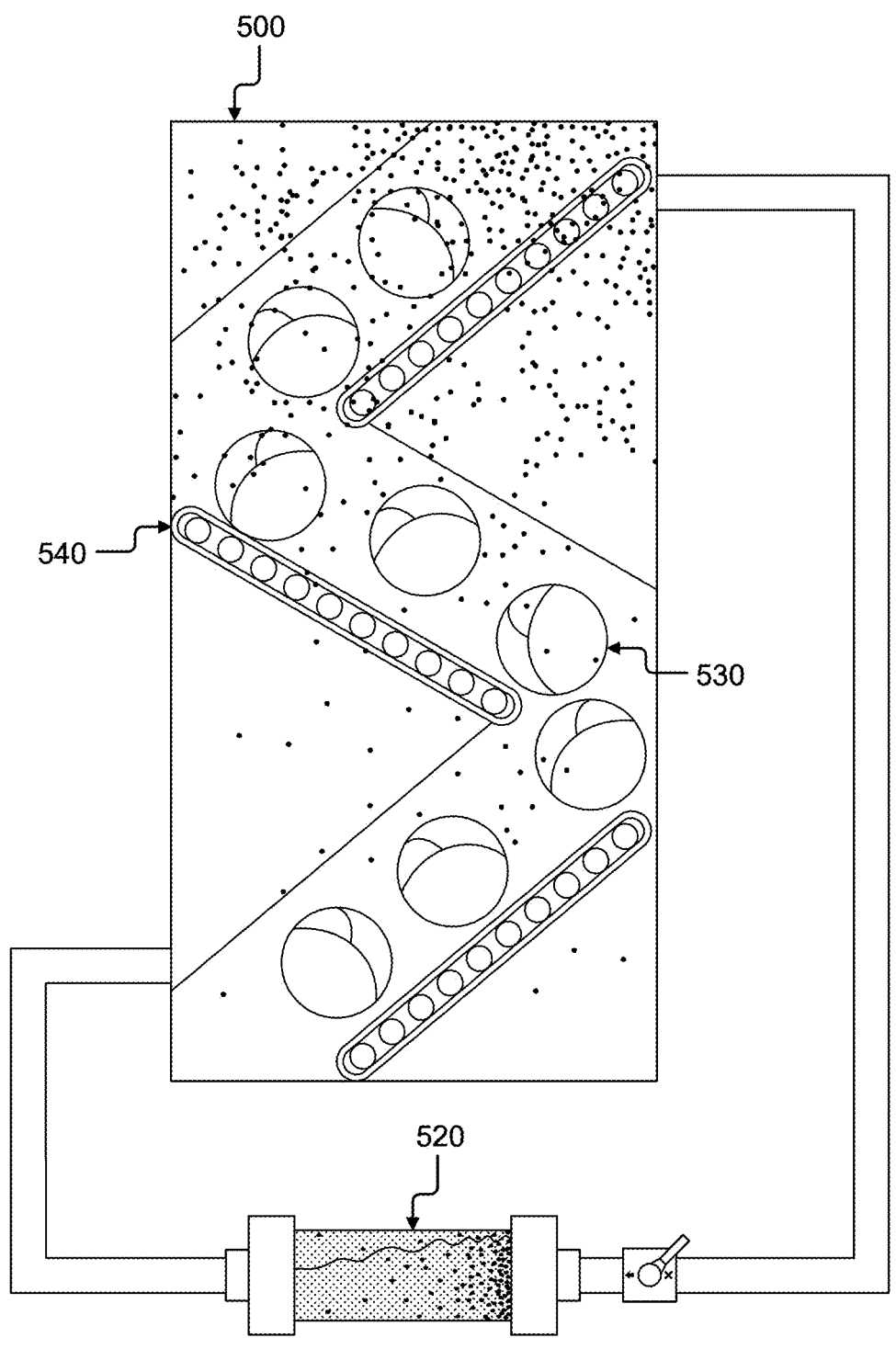
FIG. 5 illustrates an industrial fluid system with exemplary particulate removal system for fluid maintenance, according to some embodiments of the present disclosure.

Referring now to FIG. 5, an industrial fluid system 500 with exemplary particulate removal system for fluid maintenance, according to some embodiments of the present disclosure, is illustrated. In some aspects, the IFS 500 may comprise at least one conveyance system that comprises one or more conveyor belts 540. In some embodiments, the conveyance system conveyor belts 540 may be configured to transport at least one product 530 through one or more portions of the IFS 500. In some implementations, the conveyance system conveyor belts 540 may comprise at least one material that facilitates unidirectional flow of one or more products 530. In some embodiments, the walls of the IFS 500 may be configured to guide or direct the product(s) 530 along the conveyance system conveyor belts 540 through one or more portions of the IFS 500. In some implementations, the inside of the conveyance system conveyor belts 540 may comprise one or more thin walls to facilitate unidirectional movement of product(s) 530 within one or more portions of the IFS 500.

In some aspects, at least one PTM 520 may be filled with at least one fluid while one or more products 530 pass through one or more portions of the IFS 500. In some implementations, the wall(s) around the conveyance system conveyor belts 540 may be configured 20) to connect, thereby enclosing the product(s) 530 inside. In some aspects, the conveyance system conveyor belts 540 may comprise the ability to switch directions. By way of example and not limitation, a button may be pressed that may be configured to send one or more electrical signals or impulses that may toggle the functioning of one or more mechanical components to cause the conveyance system conveyor belt 540 to begin moving in an alternate direction. In some implementations, the conveyance system conveyor belts 540 may be configured to continue to operate when one or more attachments are placed within or upon the IFS 500.

Figure 6:
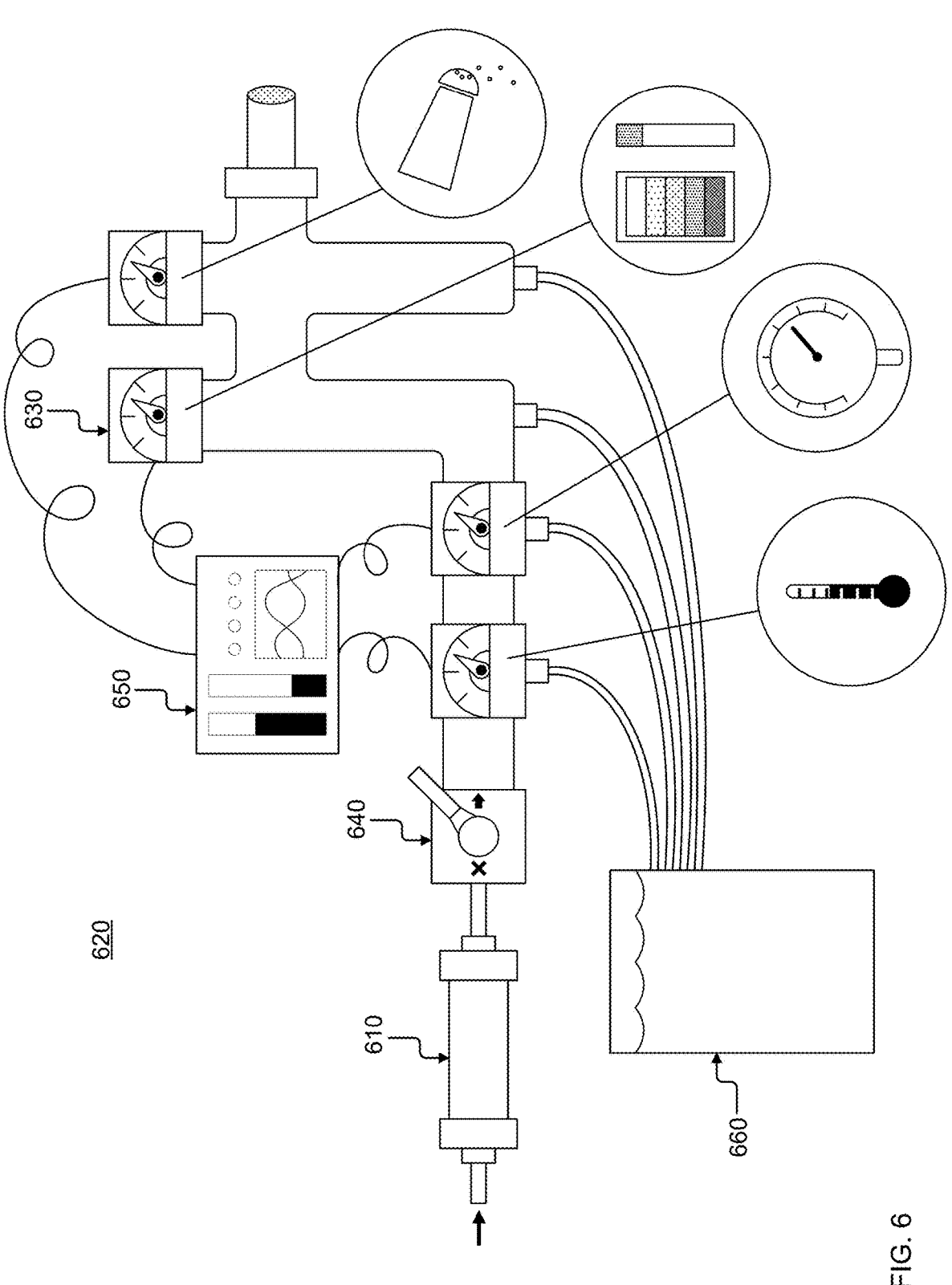
FIG. 6 illustrates an exemplary particulate removal system, according to some embodiments of the present disclosure.

Referring now to FIG. 6, an exemplary particulate removal system 620, according to some embodiments of the present disclosure, is illustrated. In some aspects, the PTM 610 may be configured before or proximal of at least one fluid actuator 640. In some implementations, the fluid actuator 640 may be configured to regulate the flow of fluid throughout one or more portions of the system as needed by the system and the product(s) being created or processed by the IFS 600. In some implementations, at least one PTM 610 may be directly connected to the fluid actuator 640. In some embodiments, the PTM 610 may be located after or distal of the fluid actuator 640, which may allow the flow of fluid to be at least temporarily blocked to the PTM 610.

In some implementations, the PRS 620 may comprise at least one self-cleaning feature which may be configured to prompt the system to execute at least one full internal cleaning of the system. In some implementations, the system may be programmed to automatically clean itself at one or more scheduled time periods or intervals. By way of example and not limitation, the system may be programmed to self-clean once every week on a Wednesday or once every eight hours.

In some aspects, the frequency and duration of a cleaning cycle may at least partially depend on a range of one or more factors, such as the type of fluid, the type of particulate, the PRS 620 structure or configuration, the IFS 600 structure or configuration, or one or more industry standards, as nonlimiting examples. By way of example and not limitation, if clogging may be predicted to occur within the PRS 620 within five hours because the particulate comprises a thick or sticky substance, such as fat or oils, then the cleaning cycle may be set to occur every four hours to limit particulate buildup. In some aspects, the PRS 620 may comprise one or more sensors configured throughout one or more portions of the system to detect when the system may be dirty and automatically initiate execution of at least one full cleaning cycle within the system. By way of example and not limitation, the system may detect that two or more sensors are dirty, and this may automatically trigger a cleaning cycle.

In some implementations, fluid from at least one separate water reservoir 660 may be used to flush out one or more portions of the system when it needs to be cleaned. In some aspects, the fluid may comprise city water, potable water, or water, as nonlimiting examples. In some implementations, the reservoir 660 may be connected directly to the system itself to supply new fluid into the system. In some embodiments, the reservoir 660 may be connected through one or more separate pipes or tubes that flush fluid into one or more separate locations of the system, such as illustrated, for example and not limitation, in FIGS. 9A and 9B. In some implementations, the fluid in the reservoir 660 may be clean, uncontaminated fluid that may be manually filled into the reservoir 660. In some aspects, the fluid in the reservoir 660 may be recycled from the system once the fluid is determined to be unharmed and free of particulate. By way of example and not limitation, the contaminated fluid may be removed from the system and cleaned and tested manually to determine the fluid is uncontaminated, and then added into the reservoir 660 after determined to be sufficient for use.

In some implementations, at least one control panel 650 may be configured to facilitate control and access to one or more of: the PRS 620, one or more sensors, the PTM 610, or sensor data, as non-limiting examples. In some embodiments, the control panel 650 may be configured to display one or more notifications about the system upon at least one display screen integrated with or communicatively coupled to the control panel 650. In some implementations, the control panel 650 may be configured to transmit one or more notifications pertaining to one or more aspects, operations, or features of the PRS 620, such as via one or more audio alerts, visual alerts, or a combination thereof, as non-limiting examples. In some implementations, the control panel 650 may be configured to be at least temporarily detached or removed from the system, allowing for portability of the control panel 650. By way of example and not limitation, the system may be configured to perform or execute one or more tests which may require large increments of time to complete, and detaching and removing the control panel 650 may enable the system to be controlled from a distance within a facility or remotely as long as the control panel 650 is still communicatively coupled to the system via at least one network connection. In some aspects, as long as the control panel 650 is still connected to the network the system may be controlled remotely via the network connection using a desktop computer, a laptop, a smartphone, or a similar computing device, as non-limiting examples.

Figure 7:
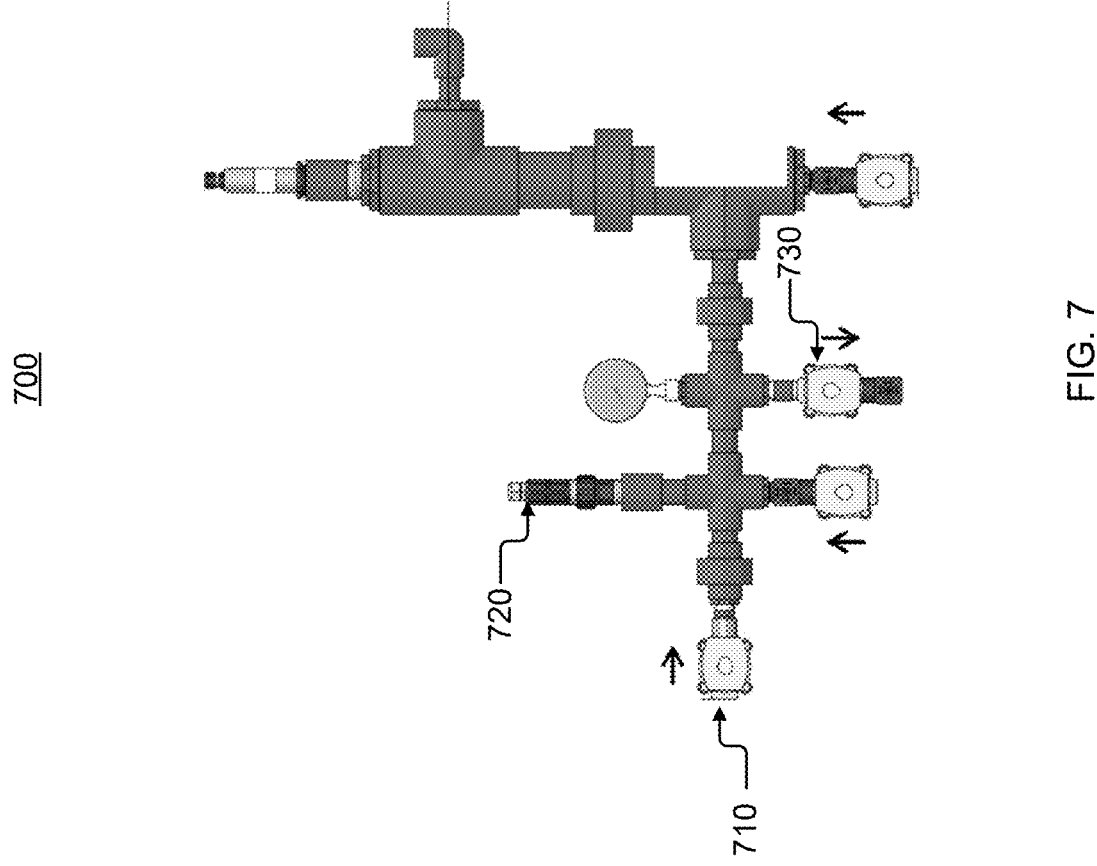
FIG. 7 illustrates an exemplary particulate removal system, according to some embodiments of the present disclosure.

Referring now to FIG. 7, an exemplary PRS 700, according to some embodiments of the present disclosure, is illustrated. In some implementations, the PRS 700 may comprise a plurality of the fluid actuators 710, 730 wherein the fluid actuators 710, 730 may comprise one or more different configurations. In some implementations, the PRS 700 may comprise at least one intake fluid actuator 710 configured to control the flow of the fluid coming in and out of the PRS 700. In some aspects, the PRS 700 may comprise one or more secondary fluid actuators 730 that may be configured to inject an amount of cleaner fluid into the system during one or more cleaning cycles. In some embodiments, the different variations of the fluid actuators 710, 730 may be used simultaneously within or upon the same PRS 700. In some aspects, the different fluid actuators 710, 730 may be used separately within or upon the same PRS 700. By way of example and not limitation, as an intake fluid actuator 710 is altered to a closed position, the secondary fluid actuator(s) 730 may be configured to be altered to an open position to initiate the execution of at least one cleaning cycle. In some non-limiting exemplary embodiments, each fluid actuator 710, 730 may be configured to be independently operated.

In some implementations, the fluid actuators 710 may be configured to be toggled off during one or more occurrences, at one or more times, or in response to one or more events, circumstances, or conditions to save energy and enable the system to operate more efficiently. In some embodiments, one or more sensors 720 configured within or upon the PRS 700 may be configured to indicate the amount of fluid within a corresponding location of the system and identify a pressure, inconsistency, or similar aspect, feature, or factor of the fluid, as non-limiting examples. In some implementations, the sensor(s) 720 may be configured to indicate when they are malfunctioning and need to be repaired or replaced. In some implementations, the sensor(s) 720 may need to be replaced manually by a user. In some implementations, the sensor(s) 720 may have the ability to self-diagnose one or more issues being experienced by the sensor(s) 720 and notify or otherwise indicate to the user how to resolve the issue.

Figure 8A:
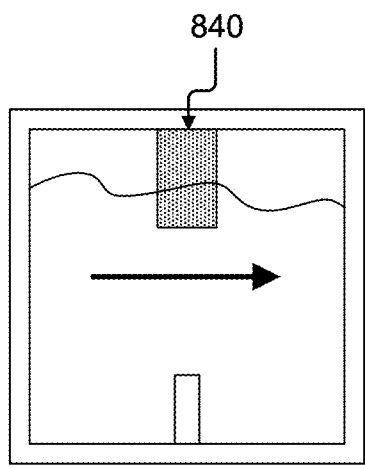
FIG. 8A illustrates an exemplary sensor in a PRS, according to some embodiments of the present disclosure.
Figure 8B:
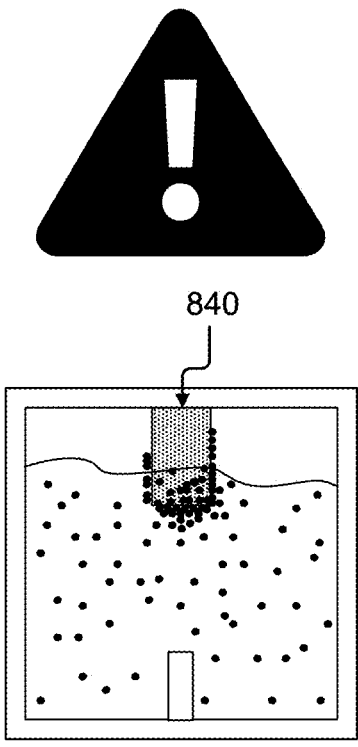
FIG. 8B illustrates an exemplary sensor in a PRS, wherein particulate may be affecting the accuracy of collected sensor data, according to some embodiments of the present disclosure.

Referring now to FIGS. 8A and 8B, an exemplary sensor 840 in a PRS, according to some embodiments of the present disclosure, is illustrated. In some aspects, a PRS may comprise at least one sensor 840 that comprises a probe that may be configured to extend into the flow of fluid to allow for direct measurement and monitoring of one or more fluid qualities and/or characteristics. In some implementations, one or more sensors 840 may be configured to measure or monitor one or more particulate, chemical, or additive levels of the fluid. In some embodiments, the fluid may be exposed into one or more instruments for continuous measurements and automatic addition of one or more chemicals to achieve or maintain a range or setpoint control. In some embodiments, at least some molecules may remain after the fluid is cleaned through at least one PTM.

In some implementations, the particulate remaining in the fluid may gradually collect on or around one or more sensors 840, which may limit the effectiveness or accuracy of the sensor(s) 840. In some aspects, at least one cleaning cycle may be executed or performed to remove any collected accumulation of particulate, thereby allowing the sensor(s) 840 to operate normally. In some embodiments, the cleaning cycle may comprise spraying the sensor(s) 840 with an amount of liquid, wherein one or both the composition of the sprayed liquid and the pressure of the sprayed liquid may facilitate removal of the particulate. In some embodiments, one or more cleansing chemicals may be selected to dissolve one or more unwanted or undesirable materials within the fluid and agglomerate the material(s) onto one or more particulate materials to be removed effectively.

Figure 9A:
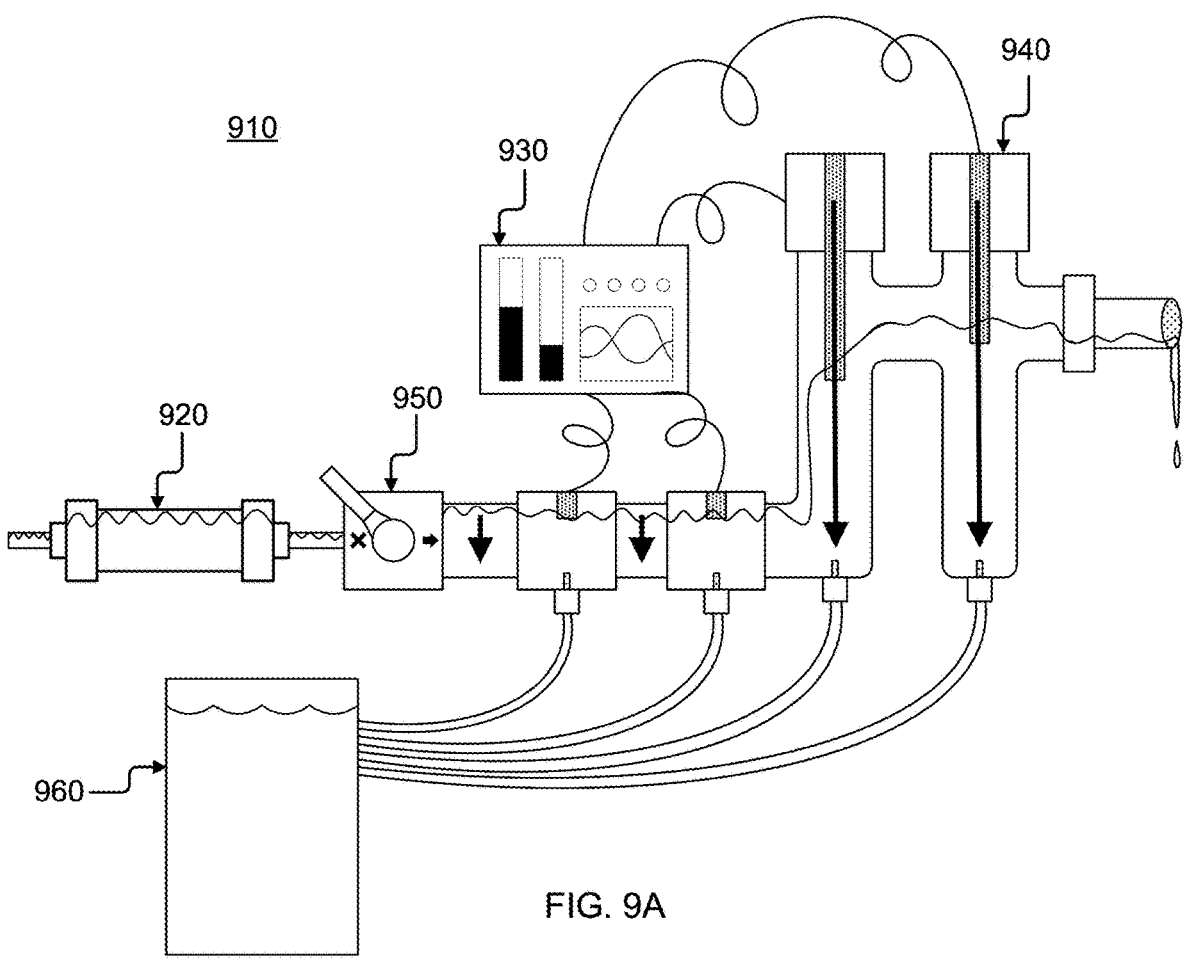
FIG. 9A illustrates an exemplary particulate removal system with an integrated cleaning system, wherein the particulate removal system is in a separation cycle, according to some embodiments of the present disclosure.
Figure 9B:
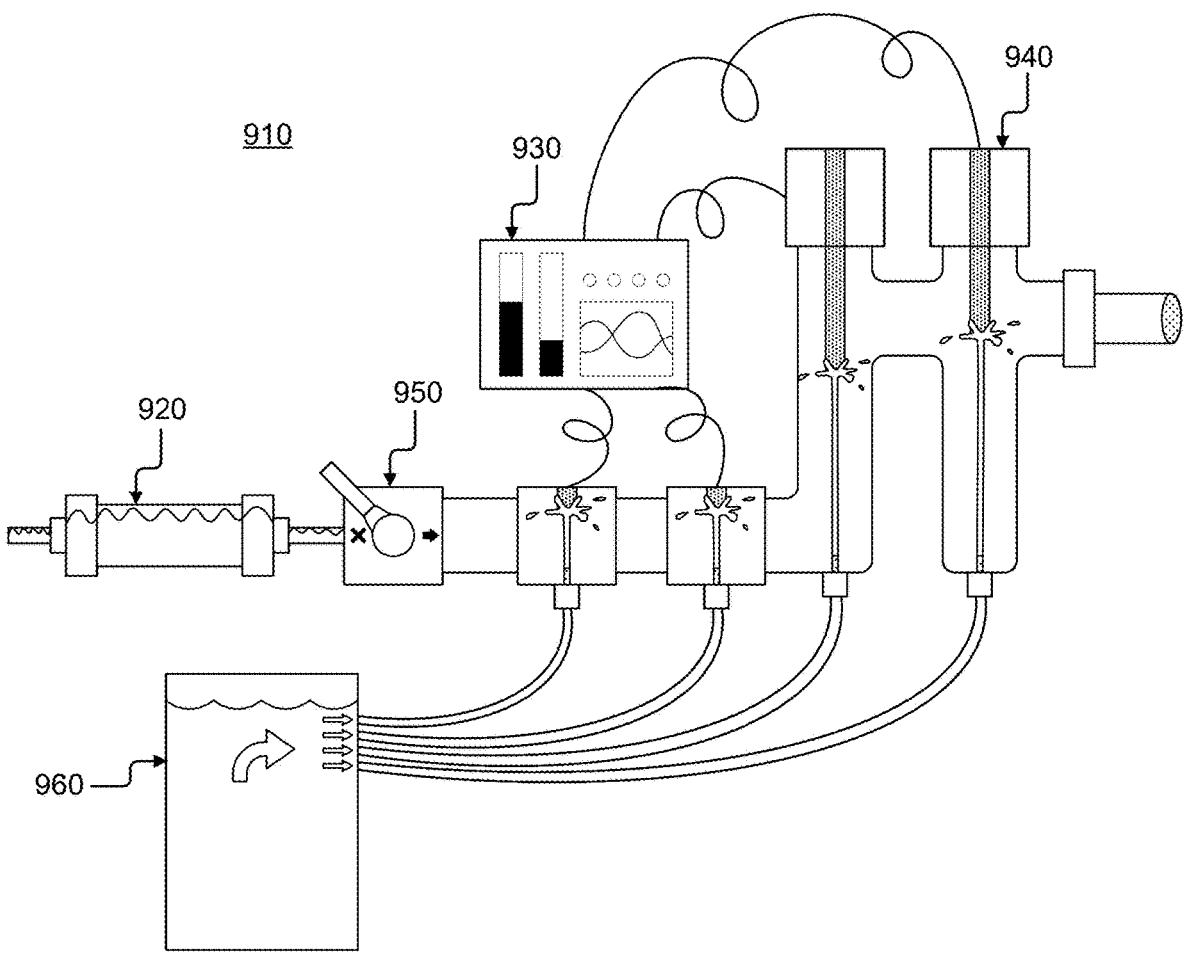
FIG. 9B illustrates an exemplary particulate removal system with an integrated cleaning system, wherein the particulate removal system is in a clean cycle, according to some embodiments of the present disclosure.

Referring now to FIGS. 9A and 9B, an exemplary PRS 910 with an integrated cleaning system, according to some embodiments of the present disclosure, is illustrated. In some implementations, one or more individual quills may be configured proximate to each sensor located in the system. In some embodiments, the quill(s) may be configured to inject an amount of fresh liquid onto the sensor(s) during at least one cleaning cycle. In some implementations, one or more fluid actuators 950 may be configured to control the flow of the fluid being pumped out by each quill. By way of example and not limitation, a cleaning cycle that comprises a longer duration or higher intensity level may require a higher fluid pressure to be supplied from the fluid actuator(s) 950.

In some aspects, at least one reservoir 960 may be configured to comprise an amount of excess fluid that may be pumped into the sensor(s) 940 via one or more connecting tubes, wherein the fluid may be pushed through the tubes using the fluid actuator(s) 950. In some embodiments, at least one control panel 930 may be configured to facilitate control of at least one cleaning cycle. In some implementations, once the sensor(s) 940 have been rinsed clean with fluid from the reservoir 960 and the cleaning cycle has been completed, the sensor(s) 940 may resume normal, routine, or expected functionality.

In some embodiments, upon completion of at least one cleaning cycle, the clean fluid may be pushed back into the IFS 900 via the fluid actuator(s) 950. In some implementations, at least one PTM 920 may be cleaned simultaneously by the fluid actuators 950 before the fluid is pushed back into the IFS 900. In some non-limiting exemplary implementations, while the system is being cleaned by a cleaning cycle, the PTM 920 may be manually cleaned concurrently by at least one user. In some embodiments the particulate removal may comprise continuous direct measurements and control of the chemicals, flow rate, pressure, pH, conductivity, temperature, and other parameters of the fluid, as non-limiting examples.

In some embodiments, the PRS 910 may be configured to operate autonomously. In some implementations, the PRS 910 may be configured to at least temporarily store an amount of data pertaining to one or more typical, routine, customary, or expected fluid cycles and chemical levels, as non-limiting examples of fluid attributes. In some aspects, the PRS 910 may be configured to utilize one or more machine learning algorithms and/or artificial intelligence infrastructures to automatically adjust one or more fluid attributes during use. In some embodiments, the PRS 910 may be configured to detect when the fluid attribute(s) exceed one or more predefined thresholds and automatically cause the IFS 900 to achieve or maintain the threshold tolerance level(s). In some implementations, the PRS 910 may be configured to monitor the predetermined threshold(s) continuously during use of the IFS 900 and activate one or more automated protocols when threshold(s) are exceeded.

As a non-limiting illustrative example, the PRS 910 may detect that the salinity of the IFS 900 is too high, that one or more of the sensor(s) are transmitting readings that exceed one or more accuracy tolerance levels, and the medium within the PTM 920 is saturated with one or more byproducts from the IFS 900. In some aspects, the PRS 910 may be configured to calculate or otherwise determine the required fluid level reduction needed to ensure that fresh water lowers the salinity level(s) to satisfy the predefined threshold(s). In some implementations, the PRS 910 may be configured to utilize at least one internal cleaning system to improve sensor accuracy. In some embodiments, the PRS 910 may be configured to repeat the cleaning cycle when the sensor reading(s) continue to display inaccuracies exceeding predetermined tolerances. In some aspects, the PRS 910 may be configured to activate at least one fluid actuator to reduce the amount of fluid flow through the PTM 920 sufficient to use one or more autonomously controlled mechanical devices to replace the saturated PTM 920 medium.

Figure 10:
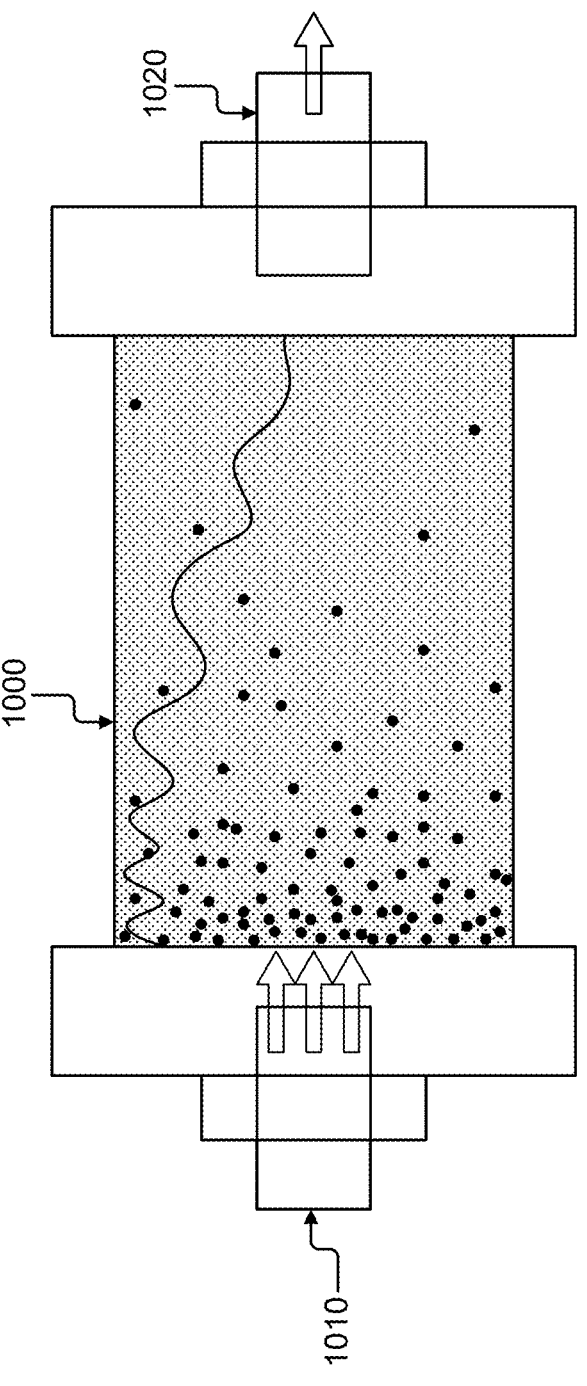
FIG. 10 illustrates an exemplary particulate trap mechanism, according to some embodiments of the present disclosure.

Referring now to FIG. 10, an exemplary PTM 1000, according to some embodiments of the present disclosure, is illustrated. In some implementations, an amount of particulate-filled fluid may be configured to flow from at least one IFS 1010 pipe into at least one PTM 1000, wherein or more media configured within the PTM 1000 may be configured to separate the particulate from the fluid while allowing unrestricted flow of the fluid in the direction of flow. In some embodiments, when the particulate is separated from the fluid, the particulate may remain trapped within the media of the PTM 1000 and the clean fluid is directed into at least one PRS 1020 pipe.

In some aspects, the fluid from the IFS 1010 may enter the PTM 1000 at a higher velocity than the fluid may travel inside the PTM 1000. In some implementations, the fluid may be cycled through the PTM 1000 multiple times. In some embodiments, the cycling of the fluid may occur through the same PTM 1000 or a series of a plurality of PTMs 1000, wherein each of the plurality of PTMs may comprise the same or different configurations or characteristics, such as diameter, media, media configuration, fluid flow rate, or fluid flow velocity, as non-limiting examples.

Figure 11A:
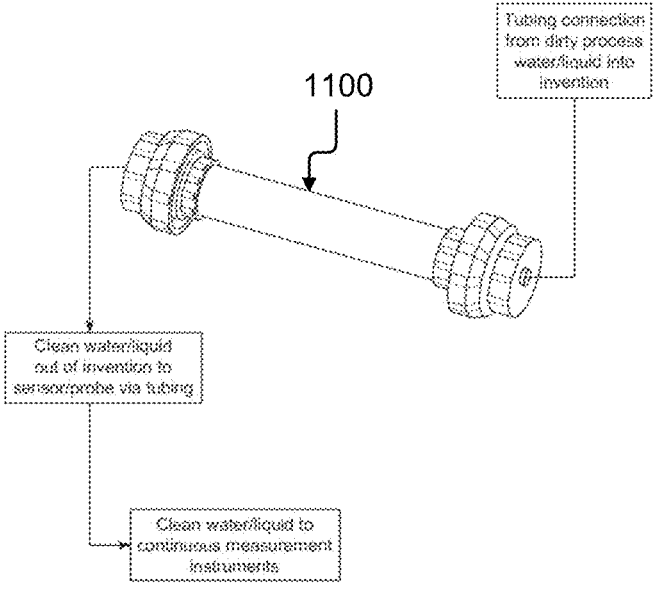
FIG. 11A illustrates an exemplary particulate trap mechanism for a particulate removal system, according to some embodiments of the present disclosure.
Figure 11B:
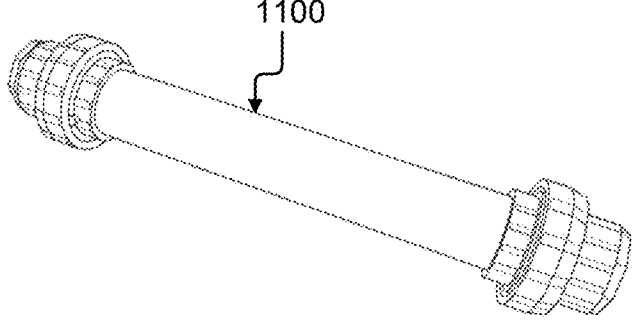
FIG. 11B illustrates an exemplary particulate trap mechanism for a particulate removal system, according to some embodiments of the present disclosure.
Figure 12A:
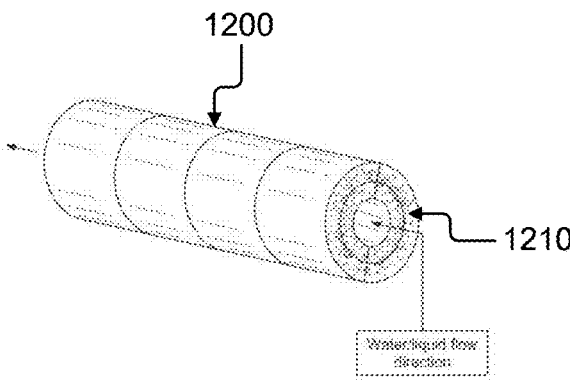
FIG. 12A illustrates a particulate trap mechanism comprising exemplary media, according to some embodiments of the present disclosure.
Figure 12B:
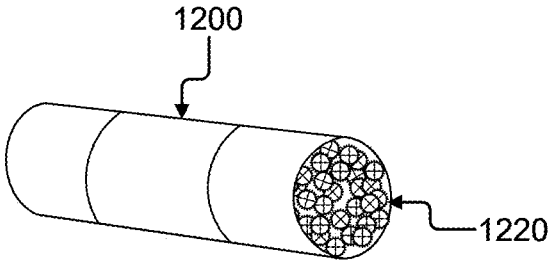
FIG. 12B illustrates a particulate trap mechanism comprising exemplary media, according to some embodiments of the present disclosure.
Figure 12C:
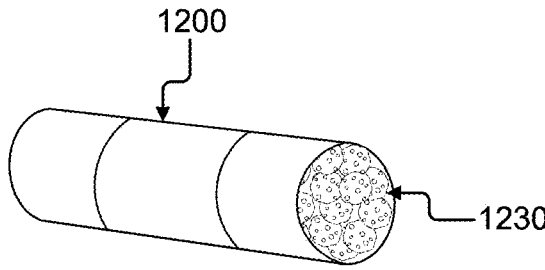
FIG. 12C illustrates a particulate trap mechanism comprising exemplary media, according to some embodiments of the present disclosure.
Figure 12D:
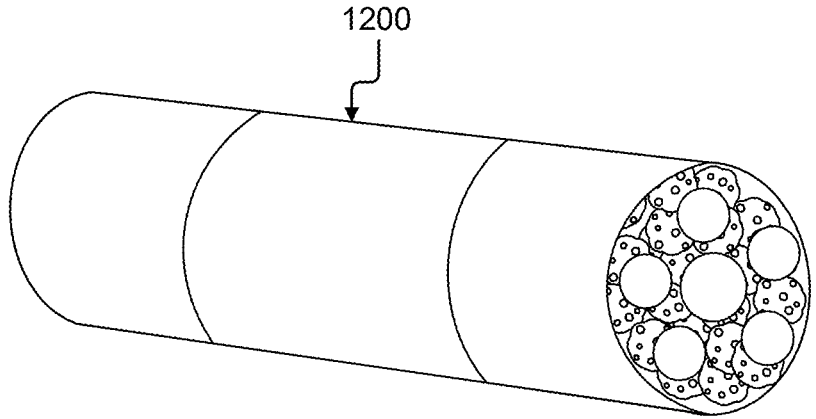
FIG. 12D illustrates a particulate trap mechanism comprising exemplary media, according to some embodiments of the present disclosure.

Referring now to FIGS. 11A-11B, an exemplary PTM 1100 for a particulate removal system, according to some embodiments of the present disclosure, is illustrated. In some implementations, a PTM 1100 may comprise a receiving end that may be configured to accept or otherwise receive fluid from at least one IFS. In some embodiments, the fluid from the IFS may be directed through the PTM 1100, wherein the PTM 1100 may be configured to remove one or more soluble materials or particulate from the fluid while simultaneously allowing unrestricted flow of fluid across the media to prevent stoppage of fluid flow. In some implementations, the cleaned fluid may flow from the PTM 1100 back into the IFS, such as for fluid maintenance. In 20) some aspects, the cleaned fluid may be directed to flow from the PTM 1100 through one or more other components of a PRS, such as, for example and not limitation, proximate to or through one or more sensors. In some embodiments, the PTM 1100 may at least partially comprise one or more of: at least one porous material, mesh, extruded plastic or similar porous fiber, plastic or other similar structures, aluminum, iron, copper, silicone, or any other similar material, as non-limiting examples. In some implementations, the PTM 1100 may be configured to withstand high temperatures and large sustained volumes of fluid. In some embodiments, the PTM 1100 may be configured to facilitate particulate removal for continuous quality monitoring or control of one or more of: the chemical(s), flow rate, pressure, pH conductivity, or temperature, of the fluid, as non-limiting examples. In some embodiments, the fluid flow may be unrestricted while particulate and suspended material may remain trapped on the media within the PTM 1100.

As a non-limiting illustrative example, a combination of a PTM 1100 and an amount of one or more iron oxides to facilitate the removal of salmonella from a poultry processing system. In some aspects, the salmonella may bond to the iron oxide(s), thereby allowing for removal of the salmonella from an IFS. In some implementations, this may be useful in a high temperature IFS, as a non-limiting example.

In some aspects, a PRS may comprise a plurality of PTMs 1100, such as, for example and not limitation, wherein a first PTM 1100 may be configured to facilitate fluid maintenance and a second PTM 1100 may be configured to facilitate continuous fluid sampling for quality control. In some embodiments, a plurality of PTMs 1100 may be configured in a series to facilitate at least one multi-step removal process for one or more materials, such as, for example and not limitation, particulate. In some implementations, fluid from an IFS may be diverted into a plurality of different PTMs 1100, which may allow for the processing of a higher volume of fluid than a single PTM 1100.

In some embodiments, one or more sensors may be configured to measure or monitor one or more chemical or particulate levels of fluid at one or more various stages in the processing process, such as when fluid is flowing from an IFS, flowing through the PTM 1100, or flowing out of the PTM 1100, as non-limiting examples. In some aspects, a decrease in particulate or chemical level may indicate that the PTM 1100 is no longer effective, such as may occur over the duration of use of the PTM 1100. In some implementations, the system may be configured to notify at least one user that the PTM 1100 may need to be serviced or replaced. In some aspects, if the fluid passes through or proximate to the sensor(s) or other probing device(s) without any indications of particulate remaining therein, then the fluid may be added back into the system. In some embodiments, the fluid may be separated into one or more instruments for continuous measurements and automatic addition of one or more chemicals to achieve or maintain a range or setpoint control.

Referring now to FIGS. 12A-12D, an exemplary PTM 1200 comprising different types of media 1210, 1220, 1230, according to some embodiments of the present disclosure, is illustrated. In some implementations, the PTM 1200 may comprise one or more different variations or configurations of media 1210, 1220, 1230. In some aspects, the configuration of media 1210, 1220, 1230 may at least partially depend on the particulate needed to be removed from the relevant fluid, the type of fluid, the structure and/or configuration of the relevant IFS, the structure and/or configuration of the PTM 1200, the configuration or type of one or more utilized sensors, or one or more industry standards, as non-limiting examples. By way of example and not limitation, a fluid may comprise caustic characteristics, and the media 1210, 1220, 1230 within the PTM 1200 may need to withstand those conditions. As another non-limiting illustrative example, macro particulate may require different media than micro particulate, which may be at least partially dissolved within the fluid. In some aspects, the media 1210 may at least partially comprise at least one scrubbing material that may be arranged within the PTM 1200 in a cylindrical pattern, which may facilitate improved water flow through the PTM 1200.

In some implementations, the PTM 1200 may comprise at least one particulate removing media 1210, 1220, 1230. In some aspects, the PTM 1200 may comprise at least one containing portion configured to contain at least a portion of the particulate removing media 1210, 1220, 1230. In some embodiments, the PTM 1200 may comprise at least one fluid intake connector configured to accept fluid from an IFS into the containing portion of the PTM 1200 and through the particulate removing media 1210, 1220, 1230. In some implementations, the PTM 1200 may comprise at least one fluid outflow connector configured to dispense clean fluid from the containing portion to a continuous direct measurement system.

In some implementations, the structural pattern of the media 1210, 1220, 1230 may be configured to decrease the velocity of the fluid flowing through to increase the amount of particulate captured by the media 1210, 1220, 1230 by increasing the duration of time during which the fluid is exposed to the media 1210, 1220, 1230. In some aspects, the structural pattern of the media 1210, 1220, 1230 may also cause the particulate to change direction within the fluid, thereby allowing for the media 1210, 1220, 1230 to collect the particulate while the water flows through the PTM 1200. In some embodiments, the particulate may be broken down by the media 1210, 1220, 1230 and separated from the fluid entirely while being left to accumulate in the media 1210, 1220, 1230. In some implementations, one or more fluid quality sensors may enable addition of one or more chemicals identified to control the level(s) of one or more desired ranges and/or setpoints. In some aspects, soluble oil from one or more oils or similar proteins may be collected within the media 1210, 1220, 1230 without reduction or loss of flow as a result of the PTM 1200 mechanical design.

In some implementations, the media 1210 may comprise one or more different materials which may include, by way of example and not limitation, one or more of: plastic, organic material, porous material, aluminum, or silicone. In some embodiments, the material composition of the media 1210 may at least partially depend on the product being produced by the relevant system or the type of particulate removed. In some implementations, the material composition of the media 1200 may at least partially depend on the usage of the system. By way of example and not limitation, in aspects wherein the PTM 1200 may be integrated into a PRS for fluid maintenance, the PTM 1200 may need to be able to withstand a large sustained volume of fluid, which may require a highly durable media 1210. In some embodiments wherein the PRS may be used for continuous fluid sampling, the media 1210 may not be configured to separate large quantities of fluid.

In some aspects, the media 1210, 1220, 1230 may be configured to be interchanged within the PTM 1200. In some embodiments, fluid may be flowed through a series of two or more PTMs 1200 that may comprise the same or different media 1210, 1220, 1230. In some aspects, different PTMs 1200 comprising different media 1210, 1220, 1230 may facilitate the removal of one or more different types of particulate materials and/or solubles, as non-limiting examples.

In some implementations, the PTM 1200 may comprise empty pockets or similar substantially hollow receptacles configured upon or within an interior portion of the PTM 1200 that may facilitate the addition or removal of different media 1210, 1220, 1230. In some aspects, the pocket(s) upon or within the interior of the PTM 1200 may allow for more flexibility when the PTM 1200 is in use. In some embodiments, the pocket(s) may facilitate increased fluid flow through the PTM 1200. By way of example and not limitation example, the pocket(s) may allow for a large amount of fluid to pass through the PTM 1200 at a faster rate than variations of the PTM 1200 that do not comprise pockets.

Figure 13A:
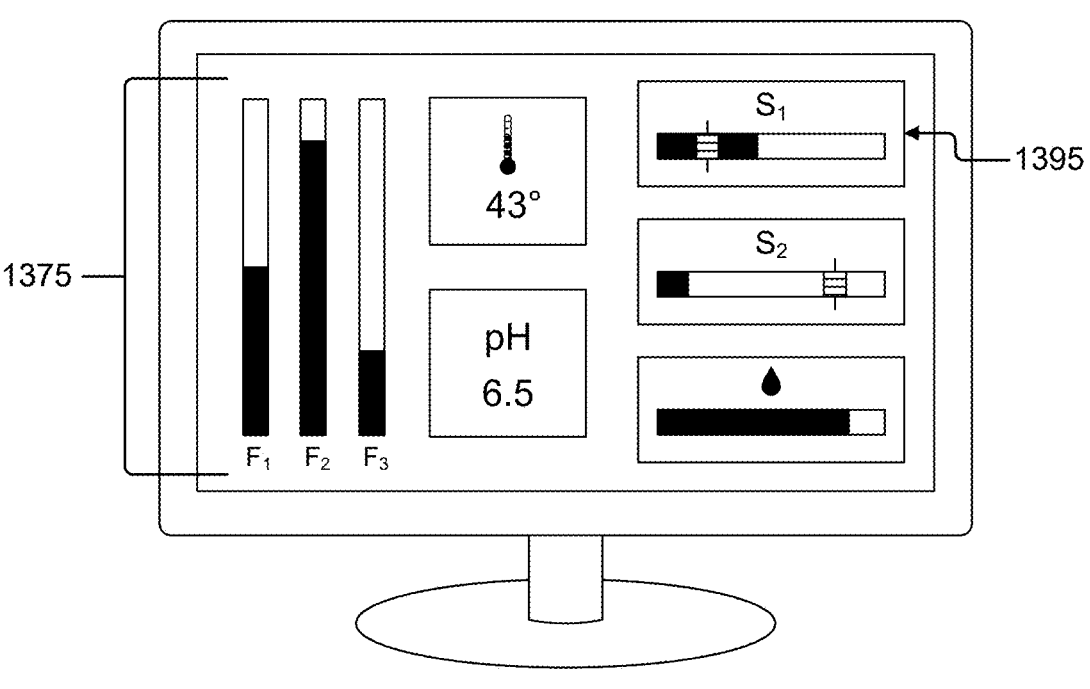
FIG. 13A illustrates an exemplary display interface of a particulate removal system, according to some embodiments of the present disclosure.
Figure 13B:
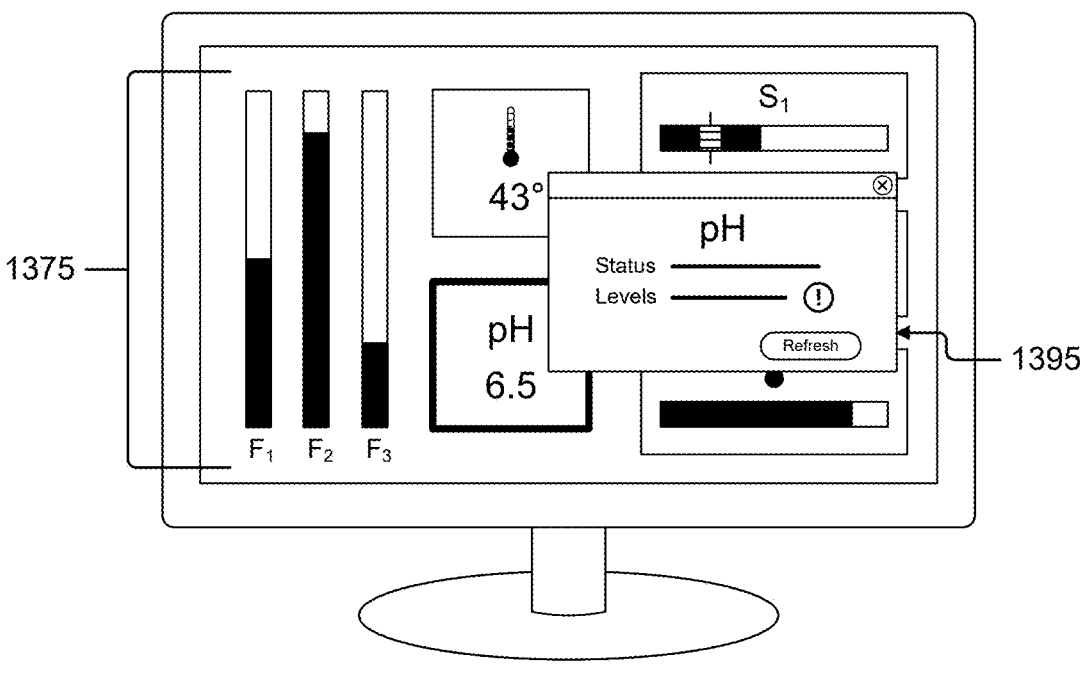
FIG. 13B illustrates an exemplary display interface of a particulate removal system, according to some embodiments of the present disclosure.

Referring now to FIGS. 13A-13B, an exemplary display interface 1395 of a particulate removal system, according to some embodiments of the present disclosure, is illustrated. In some aspects, the display interface 1395 may be configured to be accessed remotely using at least one external device communicatively coupled via at least one network connection. By way of example and not limitation, the display interface 1395 may be integrated with a first machine and the display interface 1395 may be accessed and controlled or manipulated via a laptop computer in a different location. In some implementations, the display interface 1395 may be connected to at least one application system that may be controlled via at least one external device. In some embodiments, one or more readings from at least one sensor 1360 may be transmitted from the display interface 1395 to an external device using an Internet connection, Bluetooth®, or near-field communication ("NFC") technology, as non-limiting examples.

In some aspects, the display interface 1395 may comprise a plurality of settings that allow for one or more aspects of the system to be controlled from one or more different external devices. By way of example and not limitation, one or more filtration system operations, settings, features, or characteristics may be displayed on a computer screen to facilitate user control thereof in another room of the same building as the filtration system, while the temperature may be monitored by a different user in another building via a smartphone application, as non-limiting examples. In some embodiments, the display interface 1395 maybe configured to display an entire control panel 1375 that displays temperature measurements, sensor 1360 information, separation information, pH levels, emergency notifications, or similar data, as non-limiting examples.

In some embodiments, the PRS may be configured to operate autonomously. In some implementations, the PRS may comprise at least one storage medium configured to at least temporarily store data pertaining to one or more typical, routine, customary, or expected fluid cycles and/or chemical levels, as non-limiting examples of fluid attributes. In some aspects, the PRS may be configured to utilize one or more machine learning algorithms and/or artificial intelligence infrastructures to automatically adjust one or more fluid attributes during use. In some embodiments, the PRS may be configured to detect when the fluid attribute(s) exceed one or more predefined thresholds and automatically initiate or implement one or more remedial measures to bring the relevant IFS within the threshold tolerance level(s). In some implementations, the PRS may be configured to monitor one or more predetermined thresholds continuously during use of the IFS and activate at least one automated protocol when the threshold(s) are exceeded.

As a non-limiting illustrative example, the PRS may detect that the salinity of the IFS is too high, one or more sensors are transmitting readings that exceed one or more accuracy tolerance levels, and the medium within one or more PTMs is saturated with one or more byproducts from the IFS. In some aspects, the PRS may be configured to calculate or otherwise determine the required fluid level reduction needed to ensure that fresh water lowers the salinity level(s) to satisfy the predefined threshold(s). In some implementations, the PRS may be configured to utilize at least one internal cleaning system to improve sensor accuracy. In some embodiments, the PRS may be configured to repeat the cleaning cycle when the readings continue to display inaccuracies exceeding one or more predetermined tolerances. In some aspects, the PRS may be configured to activate at least one fluid actuator to reduce the amount of fluid flow through the PTM sufficient to use one or more autonomously controlled mechanical devices to replace the saturated PTM medium.

Figure 14:
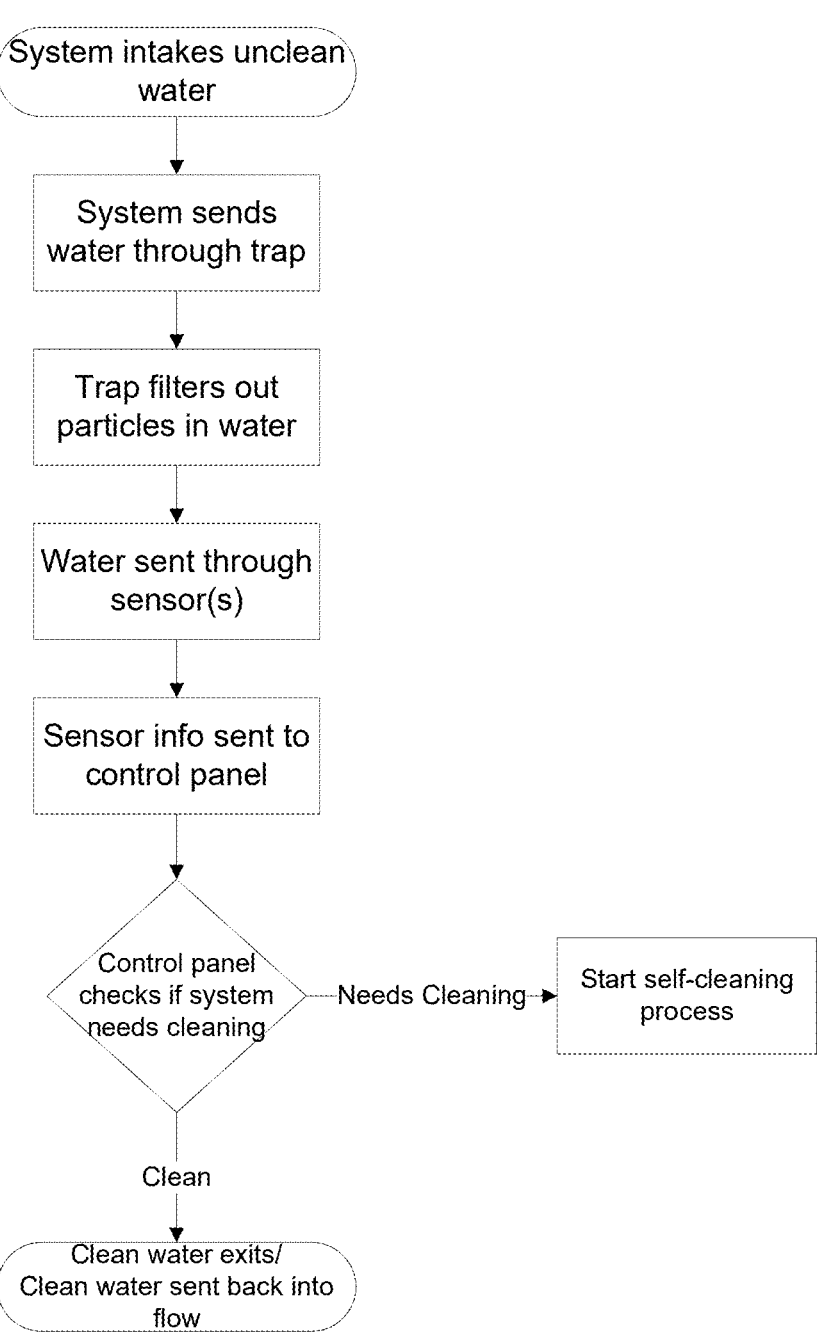
FIG. 14 illustrates an exemplary flowchart for fluid flow through a particulate removal system for continuous fluid sampling, according to some embodiments of the present disclosure.

Referring now to FIG. 14, an exemplary flowchart for fluid flow through a particulate removal system for continuous fluid sampling, according to some embodiments of the present disclosure, is illustrated. In some implementations, unseparated fluid may enter a PRS and be directed to flow through at least one PTM where one or more particulates may be removed from the fluid. In some aspects, after the fluid has been separated through the PTM, the fluid may be directed proximate to or through one or more sensors which may be configured to sense or detect 20) whether any particulate(s) remain in the fluid or to sense or detect one or more fluid qualities that may be measured and/or monitored, such as pressure, pH, conductivity, or the level or concentration of peracetic acid, acidified sodium chlorite ("ASC"), or any other acidic chemicals, as non-limiting examples.

In some implementations, if the sensor(s) detect any remaining particulate within the fluid, one or both the PRS or a user may be notified that one or more portions of the PRS may need to be cleaned. In some embodiments, the PRS may initiate at least one cleaning cycle that may remove any collected particulate(s) throughout the PRS. In some aspects, the PTM may be included in the cleaning cycle. In some embodiments, the PTM itself may comprise at least one cleaning mechanism. In some implementations, the PRS may be monitored for particulate accumulation. In some aspects, the fluid may reenter the IFS after completion of the self-cleaning cycle.

Figure 15:
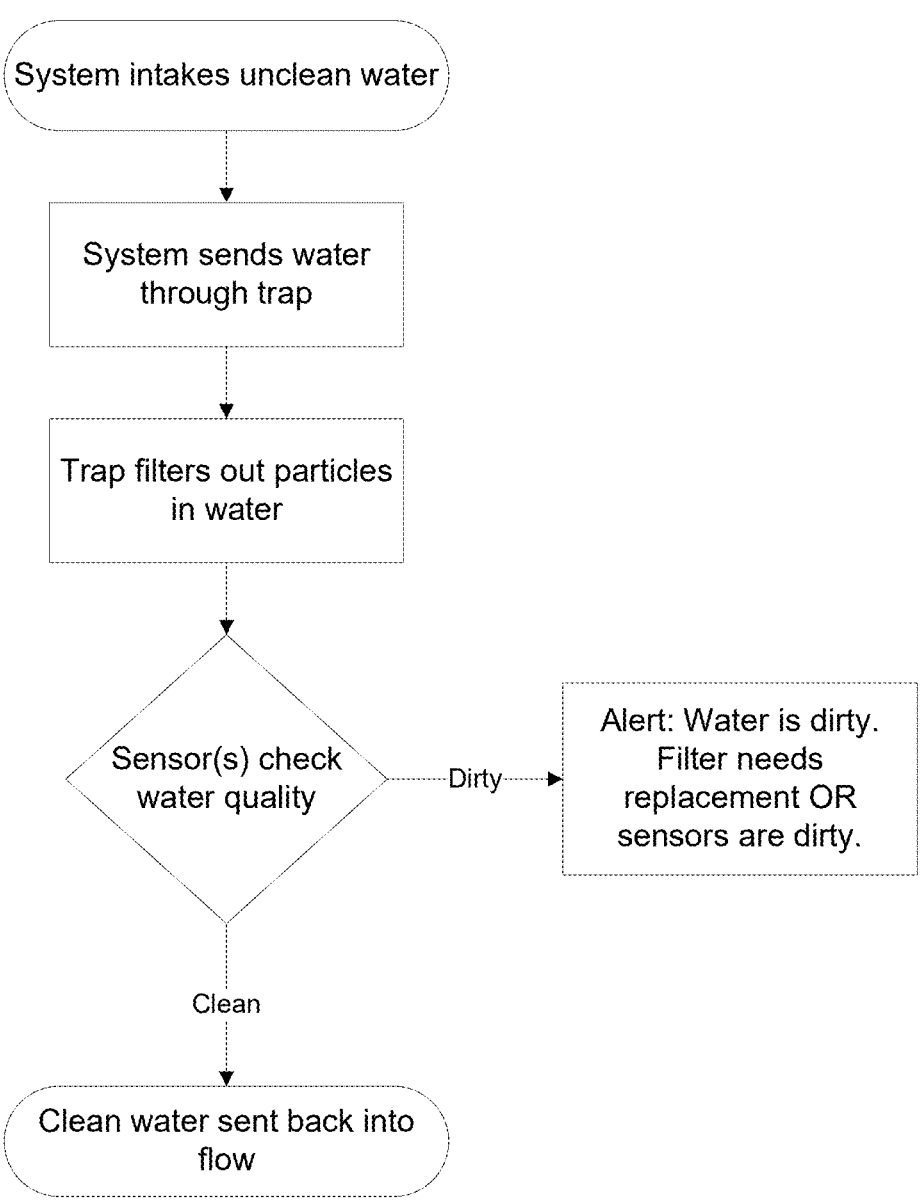
FIG. 15 illustrates an exemplary flowchart for fluid flow through a particulate removal system for fluid maintenance, according to some embodiments of the present disclosure.

Referring now to FIG. 15, an exemplary flowchart for fluid flow through a particulate removal system for fluid maintenance, according to some embodiments of the present disclosure, is illustrated. In some implementations, fluid from an IFS may be directed to flow through at least one PTM. In some aspects, one or more particulates may be separated out of the fluid and the fluid may be monitored to ensure that the fluid is "clean" according to one or more predefined standards. In some implementations, one or more sensors inside the PTM may be configured to sense or detect one or more aspects of the fluid after filtration. In some embodiments, the sensor(s) may be configured to verify whether the fluid is clean and the system may be notified of the result(s) of such verification. In some aspects, upon a determination that the fluid comprises excess particulate after filtration, the fluid may be directed to flow through at least one additional PTM or through the same PTM again. In some implementations, this cycle of directing fluid through the PTM(s) may continue indefinitely until the fluid attains an expected, required, or preferred quality level. In some embodiments, sufficient clean fluid may be directed out of the PTM(s) and back into the IFS. In some aspects, the fluid may be directed to flow through the remaining portion(s) of the PRS.

Figure 16:
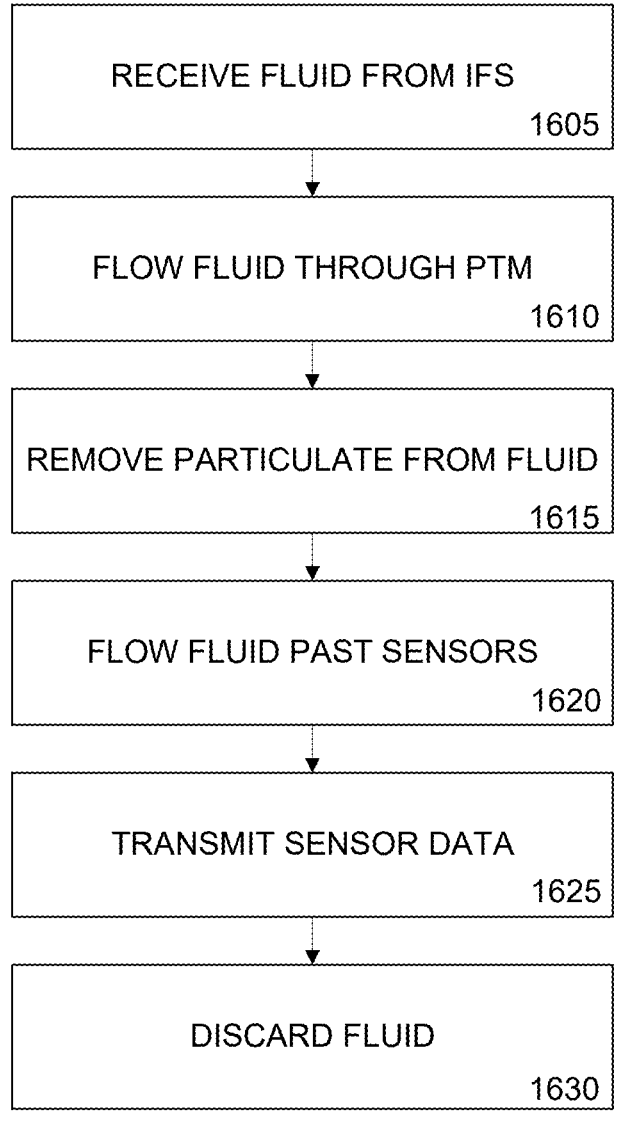
FIG. 16 illustrates exemplary method steps for removing particulate for continuous fluid sampling, according to some embodiments of the present disclosure.

Referring now to FIG. 16, exemplary method steps for removing particulate for continuous fluid sampling, according to some embodiments of the present disclosure, are illustrated. In some aspects, at 1605, fluid from an IFS may be received. In some implementations, at 1610, fluid may be directed to flow through at least one PTM. In some embodiments, at 1615, at least an amount of one or more particulates may be removed from the fluid. In some aspects, at 1620, at least a portion of the fluid may be directed to flow past, proximate to, and/or through one or more sensors to facilitate continuous fluid monitoring of the fluid. In some implementations, at 1625, sensor data may be transmitted. In some embodiments, at 1630, at least a portion of the fluid may be discarded.

In some implementations, fluid from an IFS may be directed to flow into a PRS, and subsequently through at least one PTM. In some embodiments, the PTM may be configured to separate one or more solids or soluble materials out of the fluid and just before the fluid is exposed to one or more sensors. In some implementations, once the sensor(s) have sensed or detected one or more aspects of the fluid, the sensed or detected fluid information may be sent to at least one control panel. In some aspects, the clean fluid may be directed out of the PRS once the information has been sent to the control panel and the fluid is verified to be clean.

Figure 17:
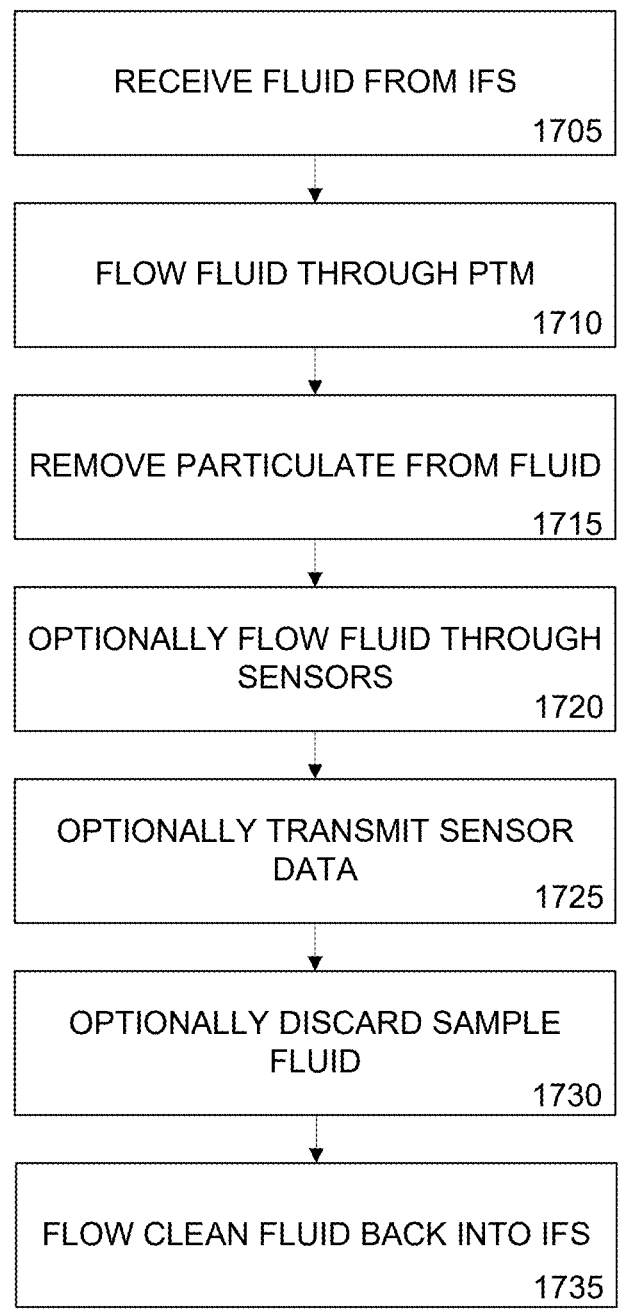
FIG. 17 illustrates exemplary method steps for removing particulate for fluid maintenance, according to some embodiments of the present disclosure.

Referring now to FIG. 17, exemplary method steps for removing particulate for fluid maintenance, according to some embodiments of the present disclosure, are illustrated. In some aspects, at 1705, fluid from an IFS may be received. In some implementations, at 1710, the fluid may be directed to flow through at least one PTM. In some embodiments, at 1715, one or more particulates may be removed from the fluid. In some aspects, at 1720, at least a portion of the fluid may be directed to flow proximate to it through one or more sensors. In some implementations, at 1725, sensor data may be transmitted. In some aspects, at 1730, sample fluid may be discarded. At 1735, clean fluid may be directed to flow back into the IFS.

In some implementations, fluid from an IFS may be directed to flow through a PRS, where one or more particulates may be removed from the fluid via at least one PTM. In some embodiments, once the fluid has entered the PTM, the media within the PTM be configured to separate out one or more solids, dissolved solids, or soluble materials from the fluid, after which the fluid may be directed proximate to or through one or more sensors. In some implementations, the sensor(s) may be configured to sense or detect one or more aspects of the fluid received from the PTM and transmit the relevant information to at least one control panel. In some aspects, once the control panel has received the information and verifies that the fluid has been sufficiently cleaned, the fluid may be directed back into the original fluid flow. In some embodiments, the control panel may be configured to adjust the addition rate of one or more chemicals to achieve or maintain one or more control ranges and/or setpoints.

Figure 18:
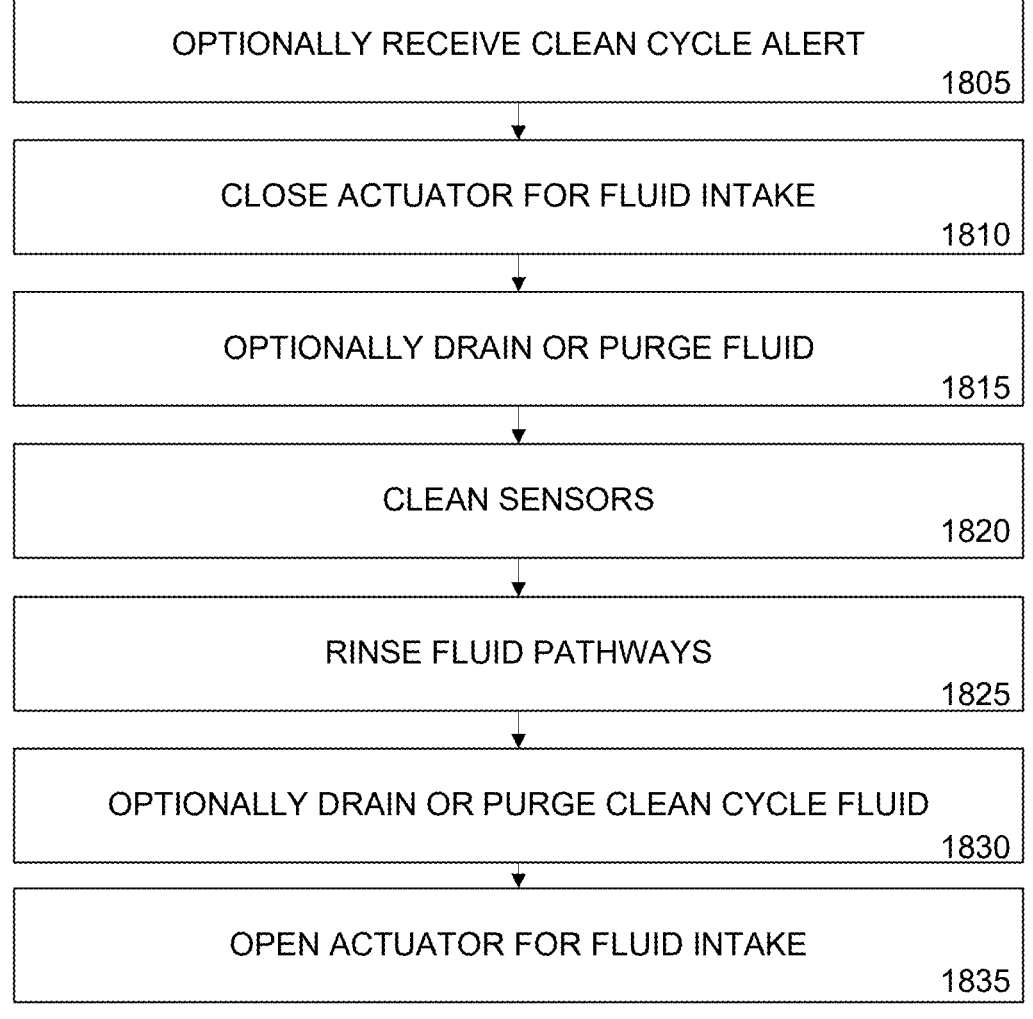
FIG. 18 illustrates exemplary method steps for removing particulate for continuous fluid sampling and fluid maintenance, according to some embodiments of the present disclosure.

Referring now to FIG. 18, exemplary method steps for removing particulate for continuous fluid sampling and fluid maintenance, according to some embodiments of the present disclosure, are illustrated. In some aspects, at 1805, at least one cleaning cycle alert may be received. In some implementations, at 1810, at least one fluid intake actuator may be closed. In some embodiments, at 1815, at least a portion of the fluid may be drained or purged. In some aspects, at 1820, one or more sensors may be cleaned, such as, for example and not limitation, by spraying the sensor(s) with fresh water. In some embodiments, at 1825, one or more fluid pathways may be rinsed, such as by directing clean water from a separate supply through the PRS. In some implementations, at 1830, cleaning cycle fluid may be drained or purged, which may limit the risk of the cleaning cycle fluid affecting sensor data after a cleaning cycle has been completed. In some embodiments, at 1835, at least one fluid intake actuator may be altered to an open position. In some aspects, the fluid intake actuator may be configured to prime the PRS for a predefined volume of fluid or a predefined period of time before sensor readings are monitored.

In some implementations, the system may receive at least one signal from the cleaning sensor notifying that a cleaning needs to occur. In some aspects, once the system has confirmed the signal, the fluid intake valve may be altered to the closed position and the remaining fluid may be drained out of the system. In some embodiments, once the fluid has been drained, the sensors and pipes may be rinsed with clean water from at least one reservoir. In some implementations, the sensors may be cleaned with a cleaning fluid, such as, for example and not limitation, a cleaning fluid that may be formulated to dissolve collected solids. In some aspects, the cleaning fluid and dissolved solids may be flushed from the PRS. In some embodiments, the intake valve may be altered to the opened position and the system may resume regular functioning. In some implementations, a predefined volume or duration of fluid from the IFS may be flushed through the PRS before the sensors may begin acquiring data again, which may limit the risk of contaminated sensor data.

Figure 19:
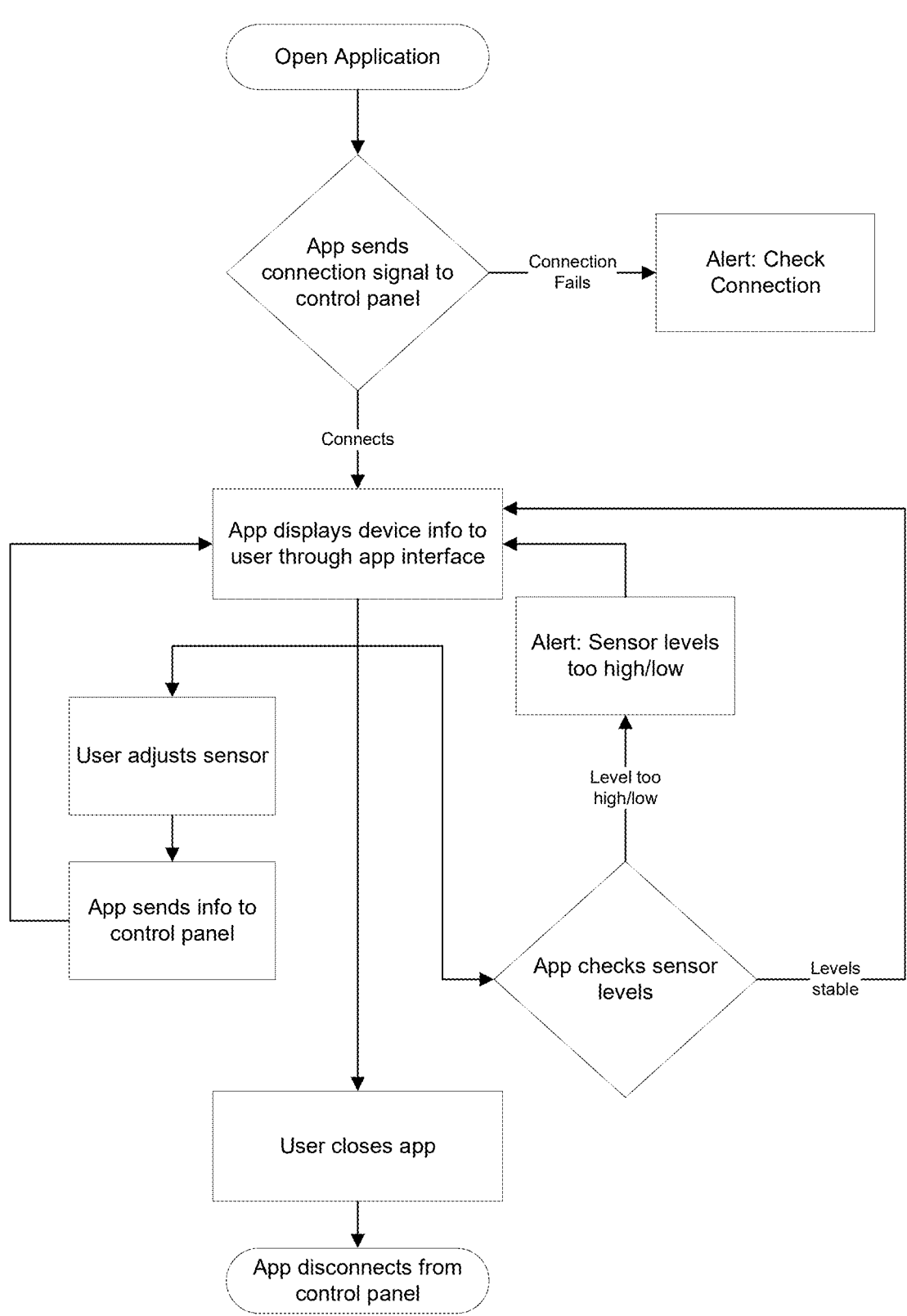
FIG. 19 illustrates an exemplary process diagram for removing particulate for remote access, according to some embodiments of the present disclosure.

Referring now to FIG. 19, an exemplary flow diagram 1900 is illustrated. In some aspects, the flow diagram 1900 may indicate how a user may access the control panel of the system remotely. In some aspects, the flow diagram 1900 may display how the user may access the control panel via a software application or program. In some implementations, the application may be configured to transmit one or more signals to the control panel. In some aspects, the application may be configured to transmit or receive data or instructions to or from one or more sensors of the system.

In some implementations, the signals may relay information back to the user so that the users may operate the system remotely. In some embodiments, the user may input one or more preset levels for the different sensors, PH levels, and other non-limiting examples of various attributes of the system. In some aspects, the application may be configured to alert the user if the preset levels are too high or too low. In some embodiments, different notifications may be associated with different discrepancies.

In some aspects, the user may have the option to set the application to auto balance one or more of the levels controlled by the control panel when a discrepancy occurs. In some implementations, the user may be required to input a passcode or similar authorization mechanism to override the system if one or more levels need to be altered. By way of example and not limitation, if one or more of the preset levels need to be adjusted, the application may require the user to enter a passcode before changing the level(s). In some embodiments, the application may be configured to record one or more types of data and send the recorded data to an offline storage system. In some aspects, when a discrepancy occurs, the application may be configured to record the discrepancy and send the information to the storage system.

In some embodiments, one or more analytical functions may be executed on the data such that a pattern may be determined to identify one or more issues within the system. In some implementations, the user may be able to manually adjust one or more of the levels remotely. In some aspects, the manual adjustments may be sent from the application to the control panel to implement the adjusted levels within the IFS. In some embodiments, the application may be configured to disconnect from the control panel when the application is closed.

Figure 20:
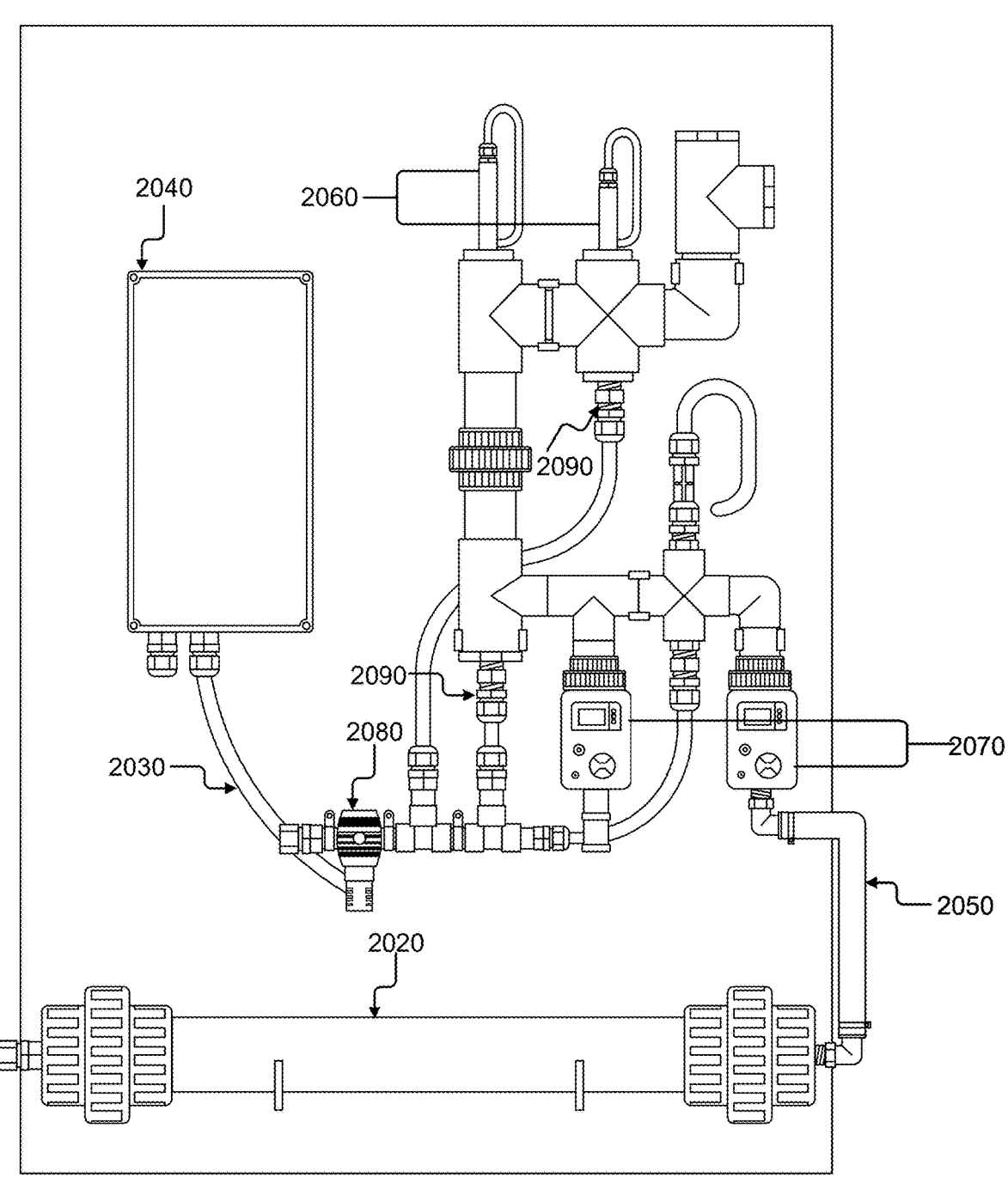
FIG. 20 illustrates an exemplary particulate removal system, according to some embodiments of the present disclosure.

Referring now to FIG. 20, an exemplary particulate removal system 2010, according to some embodiments of the present disclosure, is illustrated. In some aspects, the particulate removal system ("PRS") 2010 may comprise at least one particulate trap mechanism ("PTM") 2020. In some embodiments, the PTM 2020 may act as a separator for all of the unwanted particulate that may be removed from an industrial fluid system ("IFS") by the PRS 2010. In some implementations, the PTM 2020 may become filled with unwanted particulate, and once full the PTM 2020 may be configured to transmit one or more notifications to the IFS, such that the notification(s) may prompt a user to flush the PTM 2020 or change the media therein.

In some aspects, one or more fluids may be forced through the PTM 2020 to empty the particulate out of the PRS, or one or more fluids may be used to dissolve everything in the PTM 2020. In some embodiments, the PTM 2020 may be filled with one or more media, which may comprise, by way of example and not limitation, one or more of: porous rocks, scrubbers, plastic objects or structures, or bristles. In some implementations, one or more media may be used to facilitate a decrease in the velocity of the water flow within the PTM 2020 and cause a change in direction to cause a collision or colliding of solids, soluble materials, or particulate with media, thereby separating the solids, soluble materials, or unwanted particulate from the fluid.

In some aspects, the PTM 2020 may be configured to allow for clean water to flow out of the PTM 2020 without releasing any of the particulate from the PTM 2020. In some implementations, the PTM 2020 may be cleaned out manually when the IFS and/or the PRS 2010 is notified that the PTM 2020 is full. In some implementations, once the PTM 2020 is filled, the PTM 2020 may transmit one or more notifications or indications to the IFS and/or the PRS 2010 and the IFS and/or the PRS 2010 may generate and/or transmit one or more notifications to prompt a user to empty the PTM 2020. In some aspects, the PTM 2020 may be emptied when the IFS and/or the PRS 2010 is turned off and it is safe for the user to empty the unwanted particulate out of the PTM 2020. In some embodiments, the IFS and/or the PRS 2010 may be configured to clean the PTM 2020 periodically when it is sensed that the PTM 2020 is full or is becoming full. By way of example and not limitation, the IFS and/or the PRS 2010 may comprise a separate compartment where unwanted particulate may be automatically transferred from the PTM 2020.

In some implementations, the PTM 2020 may be configured to help break down larger solids, soluble materials, or particulate in the water stream. In some aspects, the media within the PTM 2020 may be disconnected from the PTM 2020 and cleaned out manually to reduce or minimize the occurrence of equipment failure or possible permanent damage to the media. In some embodiments, at least one fluid actuator 2080 may be used to control the flow of the fluid in the PRS 2010.

As a non-limiting illustrative example, the fluid actuator 2080 may comprise one or more automated valves, including but not limited to, actuated valves, motor operated valves, and solenoid valves. In some implementations, the fluid actuator 2080 may be configured to be altered to a closed or shut position to stop the fluid from flowing throughout the PRS 2010 when the PTM 2020 is being cleaned or the IFS and/or the PRS 2010 is being treated. In some aspects, the fluid actuator 2080 may be adjusted to one or more positions to facilitate different flow levels in the PRS 2010 at different times to account for different circumstances. By way of example and not limitation, the fluid actuator 2080 may be closed partially to reduce the fluid flow rate to accommodate an increased number of tests performed by the PRS 2010 and the fluid actuator 2080 may be reopened when the IFS and/or the PRS 2010 is done being treated.

In some embodiments, at least one sampling pipe 2050 may be configured to draw a limited stream of fluid from an industrial fluid system ("IFS"), such as may be necessary to adequately assess one or more aspects of the quality of the fluid. In some implementations, automatic addition of one or more chemicals may be provided to maintain a desired or required chemical concentration range within the IFS.

By way of example and not limitation, caustic, acid, or other material may be added to maintain a predefined pH setpoint, which may allow for the maintenance of peracetic acid, acidified sodium chlorite ("ASC"), or another chemical level, range, or setpoint required by the system while also maintaining the range of the system. In some aspects, the sampling pipe 2050 may be accessed by a user, which may allow the user to manually draw fluid to support or verify the findings of one or more sensors 2060 within the PRS 2010. In some implementations, the fluid may need to be treated based on the test results or observation by the user or the PRS 2010. In some aspects, the PRS 2010 may allow for one or more direct additives for testing purposes without affecting the overall quality of the fluid in the IFS. By way of example and not limitation, one or more dyes or chemicals may be used to prepare fluid for the sensor(s) 2060.

In some aspects, after the fluid has been separated from particulate material through the PTM 2020, the fluid may be directed proximate to or through one or more sensors 2060 which may be configured to sense or detect whether any particulate(s) remain in the fluid or to sense or detect one or more fluid qualities that may be measured and/or monitored, such as pressure, pH level, temperature, conductivity, or the level or concentration of peracetic acid, acidified sodium chlorite ("ASC"), or any other acidic chemicals, as non-limiting examples. In some aspects, the PRS 2010 may include any combination of the one or more sensors 2060, wherein the one or more sensors may be located at a different location in the PRS 2010. In some implementations, the shape and size of the one or more sensors 2060 may vary. In some implementations, the fluid actuators 2080 and the automatic valves 2090 may be configured to direct fluids directly into the one or more sensors 2060. In some embodiments, the fluid actuators 2080 and the automatic valves 2090 may include quills that may be configured to direct fluids into one or more sensors 2060.

In some embodiments, the PRS 2010 may include motor operated ball valves 2070. In some aspects, the motor operated valves 2070 may be configured to control flow rates and prevent clogging and maintenance issues. In some implementations, the arrangement of the PRS 2010 may ensure proper conditions for the one or more sensors to perform accurately. By way of example and not limitation, deviation from the organization of the PRS 2010 may result in inaccurate results and functionality.

In some embodiments, the PRS 2010 may include a reservoir 2040, wherein the reservoir 2040 may be configured to comprise an amount of excess fluid that may be pumped into the one or more sensors 2060 via one or more connecting tubes 2030, wherein the fluid may be pushed through the tubes using the fluid actuator 280. In some aspects, the one or more connecting tubes 2030 may connect throughout the PRS 2010, wherein the one or more connecting tubes 2030 guides the flow of fluids.

Figure 21:
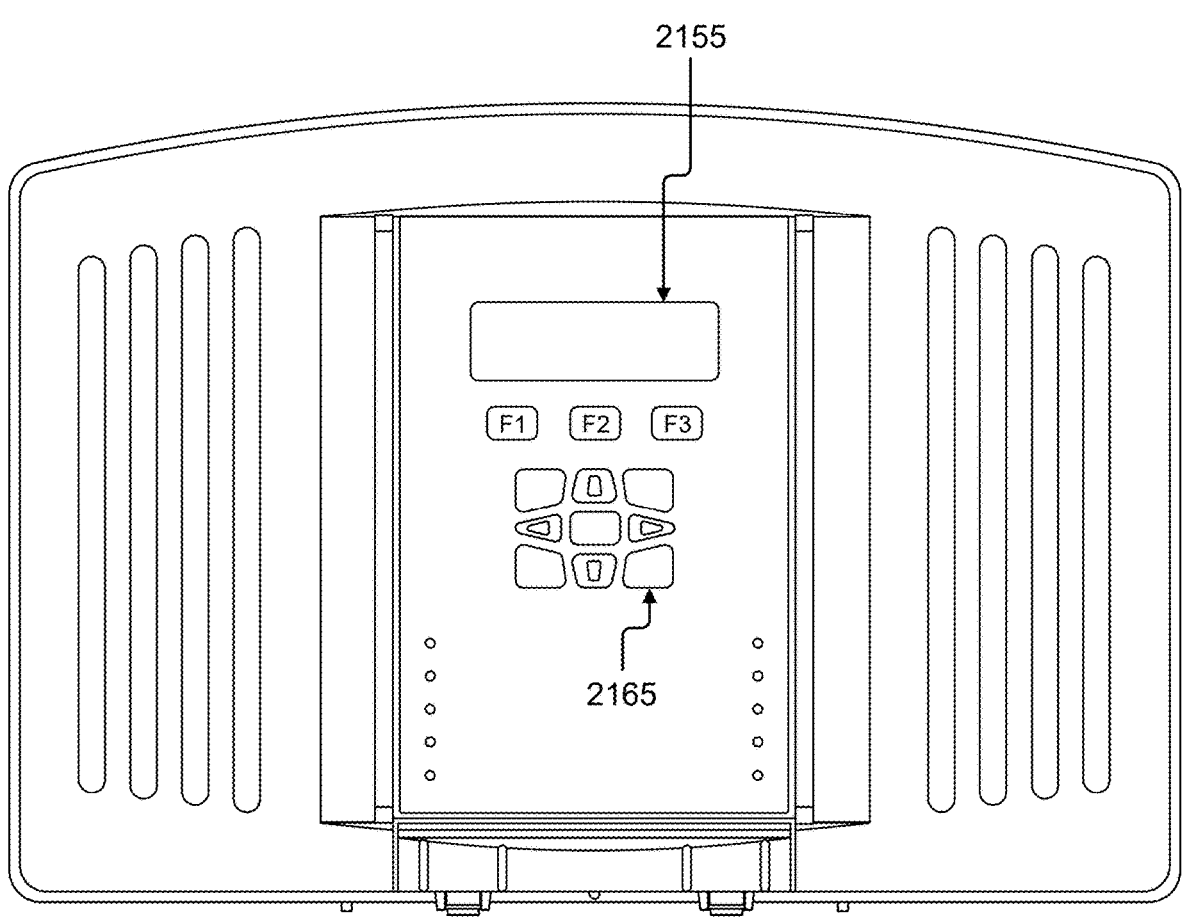
FIG. 21 illustrates an exemplary control panel for a particulate removal system, according to some embodiments of the present disclosure.

Referring now to FIG. 21, an exemplary control panel 2150 for a particulate removal system, according to some embodiments of the present disclosure, is illustrated. In some aspects, at least one control panel 2150 may be configured to facilitate control and access to one or more of: a particulate removal system ("PRS"), one or more sensors, at least one particulate trap mechanism ("PTM"), or sensor data, as non-limiting examples. In some embodiments, the control panel 2150 may be configured to display one or more notifications about a PRS upon at least one display screen 2155 integrated with or communicatively coupled to the control panel 2150. In some aspects, the control panel 2150 may be configured to receive one or more user inputs via one or more input devices, such as a touchscreen, keyboard, pointing device, microphone, camera, motion detector, scanning device, or keypad 2165, as non-limiting examples.

In some implementations, the control panel 2150 may be configured to transmit one or more notifications pertaining to one or more aspects, operations, or features of a PRS, such as via one or more audio alerts, visual alerts, or a combination thereof, as non-limiting examples. In some implementations, the control panel 2150 may be configured to be at least temporarily detached or removed from a PRS, thereby allowing for portability of the control panel 2150. By way of example and not limitation, the PRS may be configured to perform or execute one or more tests which may require large increments of time to complete, and detaching and removing the control panel 2150 may enable the system to be controlled from a distance within a facility or remotely as long as the control panel 2150 is still communicatively coupled to the PRS via at least one network connection. In some aspects, as long as the control panel 2150 is still connected to the network, the PRS may be controlled remotely via the network connection using a desktop computer, a laptop, a smartphone, or a similar computing device, as non-limiting examples.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

Reference in this specification to "one embodiment," "an embodiment," any other phrase mentioning the word "embodiment", "aspect", or "implementation" means that a particular feature, structure, or characteristic described in connection with the embodiment is included in at least one embodiment of the disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional.

Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

What is claimed is:

1. A system comprising:

a pipe system configured to receive a process fluid from an industrial fluid system;

a flow sensor configured to measure a flow rate of the process fluid within the pipe system;

a first fluid actuator in fluid communication with the pipe system and configured to regulate the flow rate of the process fluid based on a set point;

a first valve, wherein the first valve includes a first intake in fluid communication with the first fluid actuator to receive the process fluid, a second intake configured to receive a cleaning fluid, and an outlet;

a sensor housing having an intake in fluid communication with the outlet of the first valve, the sensor housing containing at least one sensor for monitoring a predefined attribute of the process fluid;

a cleaning system associated with the sensor housing, wherein the cleaning system includes:

a mechanical brush configured to clean the at least one sensor, and a cleaning solution intake configured to introduce a cleaning solution into the sensor housing;

a second valve, wherein the second valve includes:

an intake in fluid communication with the sensor housing, a first outlet configured to direct the process fluid to an outflow end, and a second outlet configured to direct the cleaning fluid and the cleaning solution to a disposal; and a controller operatively coupled to the first fluid actuator, the first valve, and the second valve, the controller configured to:

operate the system in a standard operation mode wherein the controller causes the first valve to direct the process fluid to the sensor housing and causes the second valve to direct the process fluid from the sensor housing to the first outlet; and operate the system in a cleaning cycle mode wherein the controller causes the first valve to direct the cleaning fluid to the sensor housing and causes the second valve to direct the cleaning fluid and the cleaning solution from the sensor housing to the second outlet.

2. The system of claim 1, wherein the cleaning fluid is tap water.

3. The system of claim 1, wherein the cleaning fluid is hot water.

4. The system of claim 1, wherein the cleaning solution is formulated to dissolve solids or oil build up in the sensor housing.

5. The system of claim 4, wherein the cleaning solution is a dish detergent.

6. The system of claim 1, wherein the controller is programmed to operate the cleaning cycle mode in predetermined intervals.

7. The system of claim 1, wherein the predefined attribute of the fluid include a pressure, a pH level, a temperature, a conductivity, a peracetic acid concentration, or an acidified sodium chlorite concentration.

8. An analyzer including:

a pipe system having an intake configured to receive fluid from an industrial fluid system;

an ultrasonic flow sensor positioned in the pipe system and configured to detect a flow rate, the ultrasonic flow sensor being operable with a controller to enforce a flow setpoint;

a motor-operated regulating valve in fluid communication with the pipe system and under control of the controller;

a first automated valve housing including a first valve, a first inlet coupled to the pipe system to receive the fluid from the industrial fluid system, (ii) a second inlet coupled to a fresh-water supply, and (iii) an outlet;

a cleaning reservoir fluidly coupled to the outlet of the first automated valve housing and including at least one sensor probe configured for direct measurement of a predefined attribute of the fluid, the cleaning reservoir being programmable to execute a self-cleaning cycle;

a cleaning-fluid intake for the cleaning reservoir, the cleaning-fluid intake including a capacity to receive and inject a cleaning fluid into the cleaning reservoir during the self-cleaning cycle;

a second automated valve housing including a second valve, an inlet coupled to an outlet of the cleaning reservoir, a first outlet coupled to a disposal line, and a second outlet coupled to a return line for a standard operation; and the controller in communication with the ultrasonic flow sensor, the motor-operated regulating valve, and the first and second automated valve housings, the controller being configured to:

in a standard operation mode, position the first automated valve housing to couple the pipe system to the cleaning reservoir with fluid from the industrial fluid system and position the second automated valve housing to route the fluid from the cleaning reservoir to the return line; and in a cleaning cycle, position the first automated valve housing to couple the fresh-water supply to the cleaning reservoir, operate the cleaning-fluid provision to inject a measured amount of the cleaning fluid into the cleaning reservoir, and position the second automated valve housing to route fluid from the cleaning reservoir to the disposal line.

9. The analyzer of claim 8, wherein the fresh water supply is tap water.

10. The analyzer of claim 8, wherein the fresh water supply is hot water.

11. The analyzer of claim 8, wherein the cleaning fluid is formulated to dissolve solids or oil build up in the cleaning reservoir.

12. The analyzer of claim 11, wherein the cleaning fluid is dish detergent.

13. The analyzer of claim 8, wherein the controller is programmed to operate the cleaning cycle in predetermined intervals.

14. The analyzer of claim 8, wherein the predefined attribute of the fluid includes a pressure, a pH level, a temperature, a conductivity, a peracetic acid concentration, or an acidified sodium chlorite concentration.

15. The analyzer of claim 14, wherein the sensor probe configured for direct measurement of at least two predefined attributes of the fluid.

16. A method for monitoring and maintaining a sensor, the method including:

in a standard operation mode:

receiving a process fluid from an industrial fluid system into a pipe system;

directing the process fluid from the pipe system through a first valve to a sensor housing;

monitoring a predefined attribute of the process fluid using at least one sensor located within the sensor housing; and directing the process fluid from the sensor housing through a second valve to a first outlet; and in a cleaning cycle mode:

actuating the first valve to stop receiving the process fluid and to start receiving a cleaning fluid;

directing the cleaning fluid into the sensor housing;

mechanically cleaning the at least one sensor with a brush located within the sensor housing;

introducing a cleaning solution into the sensor housing to mix with the cleaning fluid; and actuating the second valve to direct the cleaning fluid and the cleaning solution from the sensor housing to a second outlet.

17. The method of claim 16, further including the step of initiating the cleaning cycle mode at predetermined time intervals.

18. The method of claim 16, further including the step of initiating the cleaning cycle mode in response to detecting an accumulation of particulate on the at least one sensor that exceeds a predefined threshold.

19. The method of claim 16, wherein the step of mechanically cleaning the at least one sensor includes rotating the brush against a surface of the at least one sensor.

20. The method of claim 16, wherein the step of monitoring a predefined attribute includes monitoring for at least two of: a pressure, a pH level, a temperature, a conductivity, a peracetic acid concentration, or an acidified sodium chlorite concentration.

\* \* \* \* \*